(12) United States Patent
Chien et al.

(10) Patent No.: US 9,538,172 B2
(45) Date of Patent: Jan. 3, 2017

(54) GROUPING BYPASS CODED SYNTAX ELEMENTS IN VIDEO CODING

(71) Applicant: QUALCOMM Incorporated, San Diego, CA (US)

(72) Inventors: Wei-Jung Chien, San Diego, CA (US); Jianle Chen, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 13/839,855

(22) Filed: Mar. 15, 2013

(65) Prior Publication Data

US 2013/0272380 A1 Oct. 17, 2013

Related U.S. Application Data

(60) Provisional application No. 61/623,004, filed on Apr. 11, 2012, provisional application No. 61/639,836, filed on Apr. 27, 2012.

(51) Int. Cl.
*H04N 7/26* (2006.01)
*H04N 19/103* (2014.01)
(Continued)

(52) U.S. Cl.
CPC ...... *H04N 19/00018* (2013.01); *H04N 19/103* (2014.11); *H04N 19/463* (2014.11);
(Continued)

(58) Field of Classification Search
CPC ....... H04N 19/91; H04N 19/13; H03M 7/4006
See application file for complete search history.

(56) References Cited

U.S. PATENT DOCUMENTS 7,839,311 B2 11/2010 Bao et al.
8,199,796 B2 6/2012 Yousef
(Continued)

FOREIGN PATENT DOCUMENTS

EP 2391133 A1 11/2011
KR 20100058618 A 6/2010
(Continued)

OTHER PUBLICATIONS

Bross et al., "High efficiency video coding (HEVC) text specification draft 10 (for FDIS & Last Call)," 12th Meeting: Geneva, CH, 14-23 Jan. 2013, JCTVC-L1003_v34, 310 pp.
(Continued)

*Primary Examiner* — Zhubing Ren
(74) *Attorney, Agent, or Firm* — Shumaker & Sieffert, P.A.

(57) ABSTRACT

A video encoding device is configured to generate a first group of syntax elements. Each syntax element in the first group indicates whether a prediction mode of a respective prediction unit (PU) is based on an index into a list of most probable modes. A second group of syntax elements is generated that correspond to respective syntax elements in the first group. The syntax elements in the second group identify either an index into the list of most probable modes or an intra-prediction mode. The first group of syntax elements are context adaptive binary arithmetic coding (CABAC) encoded, and the second group of syntax elements are bypass encoded. A video decoder is configured to receive the entropy encoded first and second groups of syntax elements. The video decoder CABAC decodes the first group of flags and bypass decodes the second group of flags.

36 Claims, 8 Drawing Sheets

(51) Int. Cl.

| | |
|---|---|
| *H04N 21/236* | (2011.01) |
| *H04N 19/70* | (2014.01) |
| *H04N 19/61* | (2014.01) |
| *H04N 19/463* | (2014.01) |
| *H04N 19/91* | (2014.01) |
| H04N 19/13 | (2014.01) |
| H04N 19/107 | (2014.01) |

(52) U.S. Cl.
CPC ............. *H04N 19/61* (2014.11); *H04N 19/70* (2014.11); *H04N 19/91* (2014.11); *H04N 21/236* (2013.01); *H04N 19/107* (2014.11); *H04N 19/13* (2014.11)

(56) References Cited

U.S. PATENT DOCUMENTS

| | | | | |
|---|---|---|---|---|
| 8,325,814 | B2 | 12/2012 | Koo | |
| 9,288,490 | B2 | 3/2016 | Sasai et al. | |
| 2005/0175173 | A1 | 8/2005 | Nakamura | |
| 2006/0017592 | A1 | 1/2006 | Shim et al. | |
| 2009/0175349 | A1* | 7/2009 | Ye et al. | 375/240.23 |
| 2011/0001643 | A1 | 1/2011 | Sze et al. | |
| 2011/0058613 | A1 | 3/2011 | Han et al. | |
| 2011/0228858 | A1* | 9/2011 | Budagavi | H04N 19/70 375/240.25 |
| 2012/0014454 | A1 | 1/2012 | Budagavi et al. | |
| 2013/0177079 | A1* | 7/2013 | Kim et al. | 375/240.12 |

FOREIGN PATENT DOCUMENTS

| | | |
|---|---|---|
| KR | 20120058631 A | 6/2012 |
| TW | I235579 B | 7/2005 |
| TW | I353181 B | 11/2011 |
| TW | I353185 | 11/2011 |
| TW | I353792 | 12/2011 |
| WO | 09029797 | 3/2009 |
| WO | 2009029797 | 3/2009 |
| WO | 2012014170 A1 | 2/2012 |
| WO | 2012042893 A1 | 4/2012 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 10-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "Description of scalable video coding technology proposal by Qualcomm (configuration 1)", MPEG Meeting; Shanghai; (Motion Picture Expert Group or ISO/IEC JTC1/SC29/WG11),, No. m26595, Oct. 10-19, 2012, 20 pp. XP030054928.

Francois et al., "CE6b: Intra mode coding with 4 MPMs and mode ranking", JCT-VC Meeting; MPEG Meeting; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-G243, Nov. 21-30, 2011, 8 pp. XP030110227.

International Search Report and Written Opinion—PCT/US2013/035465—ISA/EPO—Jul. 10, 2013, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Karczewicz et al., "Improvements on VLC", JCT-VC Meeting; MPEG Meeting; (Joint Collaborative Team on Video Coding of ISO/IEC JTC1 /SC29/W11 and ITU-T SG 16) No. JCTVC-C263, Oct. 7-15, 2010, 5 pp. XP030007970, Guangzhou, CN ISSN: 0000-0019.

Sze et al., "A high throughput CABAC algorithm using syntax element partitioning", Proceedings of the 16th IEEE international conference on Image Processing (ICIP), Nov. 7, 2009, pp. 773-776, IEEE, Piscataway, NJ, USA, XP031628909, ISBN: 978-1-4244-5653-6.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

International Preliminary Report on Patentability—PCT/US2013/035465—The International Bureau of WIPO Geneva Switzerland Apr. 9, 2014 22 pp.

Chien, et al., "Intra mode coding for Intra NxN", JCT-VC Meeting; Mpeg Meeting; Apr. 27-May 7, 2012; Geneva; (Joint Collaborative Team on Video Coding of ISO/IEC JTC1/SC29/WG11 and ITU-T SG-16); URL: http://wftp3.itu.int/av-arch/jctvc-site/, No. JCTVC-I0302, Apr. 16, 2012, XP030112065, 4 pp.

Chuang, et al.,"Luma Intra Prediction Mode Coding", JCT-VC Meeting; Mpeg Meeting; Jul. 14-22, 2011; Torino; (Joint Collaborative Team on Video Coding of ISO/ IEC JTC1/SC29/WG11 and ITU-TSG. 16) ; URL: http://wftp3.itu.int/av-arch/jctvc-site/, No. JCTVC-F062, Jun. 30, 2011, XP030009085, 5 pp.

Kim, et al., "Signalling Chroma Intra Prediction Mode," Joint Collaborative Team on Video Coding (JCT-VC) of ITU-T SG16 WP3 and ISO/IEC JTC1/SC29/WG11; Feb. 1-10, 2012; 8th Meeting: San Jose, CA, USA, Feb. 5, 2012, JCTVC-H0475,URL,http://phenix.int-evry.fr/jct/doc_end_user/current_document.php?id=4780, 3 pp.

Kumakura, et al., "Intra Prediction Mode Coding based on Direction Difference," Jul. 14-22, 2011; Joint Collaborative Team on Video Coding (JCT-VC) of ITU-T SG16 WP3 and ISO/IEC JTC1/SC29/WG11, 6th Meeting: Torino, IT, Jul. 1, 2011, JCTVC-F339, 13 pp.

Kumakura, et al., "Fixing the Number of Mpm Candidates," Jul. 14-22 2011; Joint Collaborative Team on Video coding (JCT-VC) of ITU-T SG16 WP3 and ISO/IEC JTC1/SC29/WG11, 6th Meeting: Torino, IT, Jul. 1, 2011, JCTVC-F340, 8 pp.

Maani, et al., "Bypass Coding in Chroma Intra Modes," Feb. 1-10, 2012 Joint Collaborative Team on Video coding (JCT-VC) of ITU-T SG16 WP3 and ISO/IEC JTC1/SC29/WG11 8th Meeting: San Jose, CA, USA, Jan. 26, 2012, JCTVC-H0405, URL,http://phenix.int-evry.fr/jct/doc_end_user/current_document.php?id=4708, 2 pp.

Misra, et al., "Using CABAC bypass mode for coding intra prediction mode", JCT-VC of ITU-T SG16 WP3 and ISO/ IEC JTC1/SC29/WG11, Nov. 21-30, 2011; 7th Meeting: Geneva, CH, Nov. 18, 2011, JCTVC-G707, 7 pp.

Sasai, et al., "AHG5: Bypass bins grouping on Intra mode coding," JCT-VC of ITU-T SG16 WP3 and ISO/IEC JTC1/ SC29/WG11, Jul. 11-20, 2012; 10th Meeting: Stockholm, SE, Jul. 2, 2012, JCTVC-J0208, 9 pp.

\* cited by examiner

GROUPING BYPASS CODED SYNTAX ELEMENTS IN VIDEO CODING

RELATED APPLICATIONS

This application claims the benefit of:

U.S. Provisional Application No. 61/623,004, filed Apr. 11, 2012; and

U.S. Provisional Application No. 61/639,836, filed Apr. 27, 2012, the entire content of each of which is hereby incorporated by reference in its entirety.

TECHNICAL FIELD

This disclosure relates to video coding and more particularly to techniques for coding syntax elements in video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, so-call "smart" phones, tablet computer, video teleconferencing devices, and the like. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, High-Efficiency Video Coding (HEVC) is a video coding standard being developed by the Joint Collaboration Team on Video Coding (JCT-VC) of ITU-T Video Coding Experts Group (VCEG) and ISO/IEC Motion Picture Experts Group (MPEG).

Video compression techniques perform spatial prediction and/or temporal prediction to reduce or remove redundancy inherent in video sequences. For block-based predictive video coding, a video frame or a slice of a video frame may be partitioned into video blocks, which may be referred to as macroblocks or coding units. Each video block may be further partitioned. Video blocks in an intra-coded (I) frame or slice are encoded using spatial prediction with respect to neighboring video blocks. Video blocks in an inter-coded (P or B) frame or slice may use spatial prediction with respect to neighboring video blocks in the same frame or slice or temporal prediction with respect to other reference frames.

An inter-coded block may be coded using to a motion vector that indicates a group of reference samples used to form a predictive block. An intra-coded block may be coded using an intra-mode that points to a block of reference samples used to form a predictive block. The difference between the video block and the predictive block may be referred to as residual data. For further compression, the residual data may be transformed from the pixel domain to a transform domain, resulting in residual transform coefficients, which then may be quantized. Further, the quantized transform coefficients and predictive information may be entropy coded for further compression.

SUMMARY

In general, this disclosure describes various techniques for arranging syntax elements for predictive video coding. These techniques may reduce pipeline overhead that may affect entropy coding throughput. In one example, the order in which syntax elements are either CABAC (Context Adaptive Binary Arithmetic Coding) coded or bypass coded may be optimized. Bypass coding may refer to the arithmetic coding of bins without using an adaptive context. In one example, syntax elements that indicate intra-prediction modes of predictive units (PUs) within a coding unit (CU) may be grouped together based on whether they are to be bypass coded or CABAC coded. This grouping may reduce the total number of cycles required to entropy code the syntax elements.

In one example, the disclosure describes a method of decoding video data, the method comprising receiving an entropy encoded bitstream that includes a first group of syntax elements and a second group of syntax elements for prediction units (PUs) of a coding unit (CU), wherein syntax elements of the second group of syntax elements correspond to respective syntax elements of the first group of syntax elements, and wherein a syntax element of the first group of syntax elements indicates whether an intra-prediction mode of a respective PU in the CU is based on an index into a list of most probable modes, context adaptive binary arithmetic coding (CABAC) decoding the first group of syntax elements, subsequent to CABAC decoding the first group of syntax elements, bypass decoding the second group of syntax elements, and reconstructing the video data based on the decoded first group of syntax elements and the decoded second group of syntax elements.

In another example, the disclosure describes an apparatus for decoding video data, the apparatus comprising a video decoder configured to receive an entropy encoded bitstream that includes a first group of syntax elements and a second group of syntax elements for prediction units (PUs) of a coding unit (CU), wherein syntax elements of the second group of syntax elements correspond to respective syntax elements of the first group of syntax elements, and wherein a syntax element of the first group of syntax elements indicates whether an intra-prediction mode of a respective PU in the CU is based on an index into a list of most probable modes, context adaptive binary arithmetic coding (CABAC) decode the first group of syntax elements, subsequent to CABAC decoding the first group of syntax elements, bypass decode the second group of syntax elements, and reconstruct the video data based on the decoded first group of syntax elements and the decoded second group of syntax elements.

In another example, the disclosure describes a computer-readable storage medium having instructions stored thereon that, when executed, cause one or more processors of a device for decoding video data to receive an entropy encoded bitstream that includes a first group of syntax elements and a second group of syntax elements for prediction units (PUs) of a coding unit (CU), wherein syntax elements of the second group of syntax elements correspond to respective syntax elements of the first group of syntax elements, and wherein a syntax element of the first group of syntax elements indicates whether an intra-prediction mode of a respective PU in the CU is based on an index into a list of most probable modes, context adaptive binary arithmetic coding (CABAC) decode the first group of syntax elements, subsequent to CABAC decoding the first group of syntax elements, bypass decode the second group of syntax elements, and reconstruct the video data based on the decoded first group of syntax elements and the decoded second group of syntax elements.

In another example, the disclosure describes an apparatus for decoding video data, the apparatus comprising means for receiving an entropy encoded bitstream that includes a first group of syntax elements and a second group of syntax elements for prediction units (PUs) of a coding unit (CU), wherein syntax elements of the second group of syntax elements correspond to respective syntax elements of the first group of syntax elements, and wherein a syntax element of the first group of syntax elements indicates whether an intra-prediction mode of a respective PU in the CU is based on an index into a list of most probable modes, means for context adaptive binary arithmetic coding (CABAC) decoding the first group of syntax elements, means for bypass decoding the second group of syntax elements, subsequent to CABAC decoding the first group of syntax elements, and means for reconstructing the video data based on decoded first group of syntax elements and the decoded second group of syntax elements.

In another example, the disclosure describes a method of encoding video data, the method comprising generating a first group of syntax elements, wherein a syntax element of the first group of syntax elements indicates whether an intra-prediction mode of a respective prediction unit (PU) in a coding unit (CU) is based on an index into a list of most probable modes, generating a second group of syntax elements, wherein syntax elements of the second group of syntax elements correspond to respective syntax elements of the first group of syntax elements, context adaptive binary arithmetic coding (CABAC) encoding the first group of syntax elements, subsequent to CABAC encoding the first group of syntax elements, bypass encoding the second group of syntax elements, and outputting the video data that includes the encoded first group of syntax elements and the encoded second group of syntax elements.

In another example, the disclosure describes an apparatus for encoding video data, the apparatus comprising a video encoder configured to generate a first group of syntax elements, wherein a syntax element of the first group of syntax elements indicates whether an intra-prediction mode of a respective prediction unit (PU) in a coding unit (CU) is based on an index into a list of most probable modes, generate a second group of syntax elements, wherein syntax elements of the second group of syntax elements correspond to respective syntax elements of the first group of syntax elements, context adaptive binary arithmetic coding (CABAC) encode the first group of syntax elements, subsequent to CABAC encoding the first group of syntax elements, bypass encode the second group of syntax elements, and output the video data that includes the encoded first group of syntax elements and the encoded second group of syntax elements.

In another example, the disclosure describes a computer-readable storage medium having instructions stored thereon that, when executed, cause one or more processors of a device for encoding video data to generate a first group of syntax elements, wherein a syntax element of the first group of syntax elements indicates whether an intra-prediction mode of a respective prediction unit (PU) in a coding unit (CU) is based on an index into a list of most probable modes, generate a second group of syntax elements, wherein syntax elements of the second group of syntax elements correspond to respective syntax elements of the first group of syntax elements, context adaptive binary arithmetic coding (CABAC) encode the first group of syntax elements, subsequent to CABAC encoding the first group of syntax elements, bypass encode the second group of syntax elements, and output the video data that includes the encoded first group of syntax elements and the encoded second group of syntax elements.

In another example, the disclosure describes an apparatus for encoding video data, the apparatus comprising means for generating a first group of syntax elements, wherein a syntax element of the first group of syntax elements indicates whether an intra-prediction mode of a respective prediction unit (PU) in a coding unit (CU) is based on an index into a list of most probable modes, means for generating a second group of syntax elements, wherein syntax elements of the second group of syntax elements correspond to respective syntax elements of the first group of syntax elements, means for context adaptive binary arithmetic coding (CABAC) encoding the first group of syntax elements, means for bypass encoding the second group of syntax elements, subsequent to CABAC encoding the first group of syntax elements, and means for outputting the video data that includes the encoded first group of syntax elements and the encoded second group of syntax elements.

The details of one or more examples are set forth in the accompanying drawings and the description below. Other features, objects, and advantages will be apparent from the description and drawings, and from the claims.

DETAILED DESCRIPTION

Figure 1:
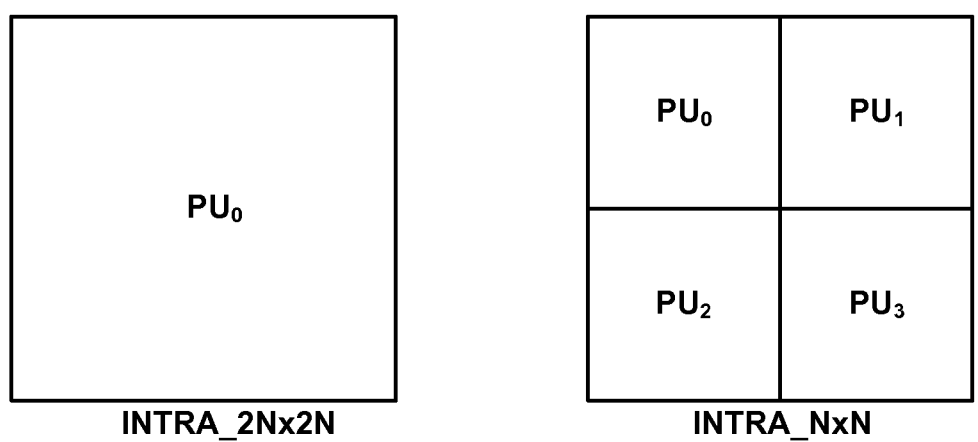
FIG. 1 is a conceptual diagram illustrating examples of prediction unit structures and associated intra-prediction coding modes.

Predictive syntax elements within a group of syntax elements, such as syntax elements that may indicate an intra-prediction mode for one or more prediction units, may either be regular context adaptive binary arithmetic coding (CABAC)-coded or bypass coded. The order in which these predictive syntax elements are received by a CABAC coder may affect the total number of processing cycles required to entropy code the group of syntax elements. This may be due to the setup overhead required to restart a CABAC coding engine as coding transitions between bypass coding and CABAC coding. In the techniques described in this disclosure, these syntax elements may be arranged in a manner such that the total number of processing cycles required to entropy code the group of syntax elements is reduced.

For instance, in some other techniques, for intra-prediction, a video encoder signals syntax elements that specify the intra-prediction mode of luma samples and signals syntax elements for the chroma samples. Some of the syntax elements for the luma samples and some of the syntax elements for the chroma samples are CABAC coded and the other syntax elements for the luma samples and chroma samples are bypass coded. In some cases, the CABAC coded and bypass coded syntax elements are interleaved resulting in suboptimal entropy coding throughput because of the pipeline overhead.

For example, bypass-mode usually has much higher throughput than CABAC-mode. As one example, bypass-mode may process 6 bins in one cycle without adding significant complexity than bypass-mode that processes 1 bin per cycle, while CABAC-mode may only process 2 bins per cycle with much complex design than CABAC-mode that processes 1 bin per cycle. This is due to the natural of context-switching in CABAC-mode.

To increase entropy coding throughput, it may be beneficial to group CABAC-coded syntax elements together and bypass coded syntax elements together. As one example, the CABAC-coded syntax elements and the bypass coded syntax elements are not interleaved together. As described in more detail, the techniques described in this disclosure provide various example techniques of grouping CABAC coded syntax elements together and bypass coded syntax elements together, which has the possibility of increasing entropy coding throughput.

As one example, a video encoder encodes and signals in a coded bitstream and a video decoder receives and decodes from the coded bitstream all CABAC-coded bins of luma intra mode and chroma intra mode together and all bypass-coded bins of luma intra mode and chroma intra mode together. As another example, a video encoder encodes and signals in a coded bitstream and a video decoder receives and decodes from the coded bitstream all CABAC-coded bins of intra mode for all blocks in a coding unit, and all bypass-coded bins of intra mode together. As another example, a video encoder encodes and signals in a coded bitstream and a video decoder receives and decodes from the coded bitstream all CABAC-coded bins of both luma and chroma intra mode for all blocks in a coding unit, and all bypass-coded bins of luma and chroma intra mode together. In some cases, some extra memory will be needed to store partial decoded syntax for the video decoder.

Digital video devices implement video compression techniques to encode and decode digital video information more efficiently. Video compression techniques may be defined according to a video coding standard. HEVC standardization efforts are based on a model of a video coding device referred to as the HEVC Test Model (HM). The HM presumes improvements in the capabilities of current video coding devices with respect to video coding devices available during the development of other previous video coding standards, e.g., ITU-T H.264/AVC. For example, whereas H.264 provides nine intra-prediction encoding modes, HEVC provides as many as thirty-five intra-prediction encoding modes. A recent working Draft (WD) of HEVC, referred to as "HEVC Working Draft 6" or "WD6," is described in document JCTVC-H1003, Bross et al., "WD6: Working Draft 6 of High-Efficiency Video Coding (HEVC)," Joint Collaborative Team on Video Coding (JCT-VC) of ITU-T SG16 WP3 and ISO/IEC JTC1/SC29/WG11, 8th Meeting: San Jose, Calif., USA, February, 2011.

Further, another recent working draft of HEVC, Working Draft 8, is described in document HCTVC-J1003 d7, Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, 10th Meeting: Stockholm, SE, July, 2012. A more recent working draft of HEVC, Working Draft 9, is available, as of Mar. 6, 2013 from http://phenix.int-evry.fr/jct/doc_end_user/documents/11_Shanghai/wg11/JCTVC-K1003-v10.zip. The HEVC standard may also be referred to as ISO/IEC 23008-HEVC, which is intended to be the standard number for the delivered version of HEVC. Although techniques of this disclosure are described with respect to the ITU-T H.264 standard and the HEVC standard, the techniques of this disclosure are generally applicable to any video coding standard.

A video sequence typically includes a series of video frames, also referred to as pictures. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Each video frame may include a plurality of slices. Each slice may include a plurality of video blocks. A video encoder typically operates on video blocks within individual video frames in order to encode the video data. The video blocks may have fixed or varying sizes, and may differ in size according to a specified coding standard.

As an example, the ITU-T H.264 standard supports intra-prediction for various block sizes, such as 16×16, 8×8, or 4×4 for luma components, and 8×8 for chroma components, as well as inter-prediction for various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Pixels may also be referred to as samples. Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Video blocks may comprise blocks of pixel data in the pixel domain, or blocks of transform coefficients in the transform domain. Transform coefficients may be generated following the application of a transform, such as, a discrete cosine transform (DCT), an integer transform, a wavelet transform, or a conceptually similar transform, to the residual video block data representing pixel differences between coded video blocks and predictive video blocks. In some cases, a video block may comprise blocks of quantized transform coefficients in the transform domain.

Smaller video blocks may provide better resolution, and may be used for locations of a video frame that include high levels of detail. In general, blocks and the various partitions, sometimes referred to as sub-blocks, may be considered video blocks. In addition, a slice may be considered to be a plurality of video blocks, such as blocks and/or sub-blocks. Each slice may be an independently decodable unit of a video frame. Alternatively, frames themselves may be decodable units, or other portions of a frame may be defined as decodable units. The term "coded unit" may refer to any independently decodable unit of a video frame such as an entire frame or a slice of a frame, a group of pictures (GOP) also referred to as a sequence, or another independently decodable unit defined according to applicable coding techniques.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), probability interval partitioning entropy coding (PIPE), or another entropy coding methodology. Entropy coding of syntax elements, such as a syntax element defining a prediction mode, may also be performed. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

HEVC refers to a block of video data as a coding unit (CU). In general, the techniques of this disclosure relate to transforming, quantizing, scanning, and entropy encoding data of a CU. A CU may include one or more prediction units (PUs) and/or one or more transform units (TUs). PUs may also be referred to as "prediction partitions." Syntax data within a bitstream may define a largest coding unit (LCU), which is a largest coding unit in terms of the number of pixels. In general, an LCU has a similar purpose to a macroblock of H.264. However, an LCU is not necessarily limited to a particular size and may include one or more CUs. An LCU typically includes 64×64 pixels. CUs within an LCU typically include 32×32, 16×16, or 8×8 pixels. Thus, an LCU may be split into sub-CUs and each sub-CU may be further split into sub-CUs. Each pixel in a CU may include a luma (Y) component, a chroma U (U) component, and a chroma V (V) component. In some examples, the chroma components may be referred to as $C_r$ and $C_b$ components. In general, references in this disclosure to a CU may refer to a largest coding unit (LCU) of a picture or a sub-CU of an LCU. Syntax data for a bitstream may define a maximum number of times an LCU may be split, referred to as CU depth. Accordingly, syntax data may also define a smallest coding unit (SCU). This disclosure also uses the term "block" to refer to any of a CU, PU, or TU.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a prediction direction that identifies a reference picture list (e.g., list 0 or list 1) for the motion vector, and/or a reference picture index value that indicates a reference frame within the reference picture list to which the motion vector points. In a similar manner, when a CU is coded in intra-prediction mode, a PU may include data defining an intra-prediction mode (e.g., angular prediction, DC prediction, or Planar prediction, . . . , etc.).

Data for the leaf-CU defining the PU(s) may also describe, for example, a partitioning of the CU into one or more PUs. A partitioning of a CU into one or more PUs may be referred to as a partitioning mode. Partitioning modes that are available for a CU may differ depending on whether the CU is uncoded, intra-prediction mode encoded, or inter-prediction mode encoded. For intra-coding, a PU may be treated the same as a leaf transform unit described below.

A leaf-CU may include one or more transform units (TUs). In general, this disclosure uses the terms CU and TU to refer to leaf-CU and leaf-TU, respectively, unless noted otherwise. The transform units may be specified using a TU quadtree structure, as discussed above. That is, a split flag may indicate whether a leaf-CU is split into four transform units. Then, each transform unit may be split further into four sub TUs. When a TU is not split further, it may be referred to as a leaf-TU. In general, a split flag may indicate that a leaf-TU is split into square-shaped TUs. In order to indicate that a TU is split into non-square shaped TUs, other syntax data may be included, for example, syntax data that indicates that TUs are to be partitioned according to NSQT.

Generally, for intra-coding, all of the leaf-TUs belonging to a leaf-CU may share the same intra-prediction mode. That is, the same intra-prediction mode is may be applied to calculate predicted values for all TUs of a leaf-CU. For intra-coding, a video encoder may calculate a residual value for each leaf-TU using the intra-prediction mode, as a difference between the portion of the predictive values corresponding to the TU and the original block. The residual value may be transformed, quantized, and scanned, as described above. For inter-coding, a video encoder may perform prediction at the PU level and may calculate a residual for each PU. The residual values corresponding to a leaf-CU may be transformed, quantized, and scanned. For inter-coding, a leaf-TU may be larger or smaller than a PU. For intra-coding, a PU may be collocated with a corresponding leaf-TU. In some examples, the maximum size of a leaf-TU may be the size of the corresponding leaf-CU.

In HEVC, the number of intra-prediction modes used to generate a predictive block for a CU is determined by the PU structure. A PU structure of INTRA_2N×2N indicates that a CU only includes one PU. A PU structure of INTRA_N×N indicates that a CU includes four PUs. Further, each PU within a CU may have one luma intra-prediction mode and PUs within a CU may share one chroma prediction mode. For example, a CU with an INTRA_2N×2N PU structure may have one luma intra-prediction mode and one chroma intra-prediction mode. Further, a CU with an INTRA_N×N PU structure may have four luma intra prediction modes (i.e., one for each PU) and one chroma intra-prediction mode for the whole CU (i.e., the four PUs shares a chroma prediction mode). Syntax elements may be generated to signal the intra-prediction modes.

FIG. 1 is a conceptual diagram illustrating examples of prediction unit structures and associated intra-prediction coding modes. As illustrated in FIG. 1, the INTRA_2N×2N prediction unit (PU) structure includes only one PU and the INTRA_N×N PU structure includes four PUs. As illustrated in FIG. 1, the INTRA_N×N PU structure is symmetric and includes four square PUs of equally size. As described above, each of the four PUs illustrated in FIG. 1 may have a luma intra-prediction and share a chroma intra-prediction. It should be noted that HEVC defines other PU structures for use with inter-mode predictions. Some of these PUs are non-symmetric and/or include rectangular PUs. Although the techniques of this disclosure are described with respect to the INTRA_2N×2N PU and INTRA_N×N PU structures, the techniques are generally applicable to additional PU structures that may be used with intra-prediction modes. For example, the techniques of this disclose may be applicable in the case where a PU structure of four rectangular PUs is associated with an intra-prediction coding mode.

As described above, when a CU is coded using an intra-prediction mode, syntax elements may be used to signal the intra-prediction modes. In some examples, three syntax elements are used to signal a luma intra-prediction mode for a PU and one syntax element is used to signal a chroma intra-prediction mode. The syntax elements are shown in Table 1 in bold.

TABLE 1 prev_intra_luma_pred_flag[ x0 ][ y0 ]
if( prev_intra_luma_pred_flag[ x0 ][ y0 ] )
  mpm_idx[ x0 ][ y0 ]
Else
  rem_intra_luma_pred_mode[ x0 ][ y0 ]
  intra_chroma_pred_mode[ x0 ][ y0 ]

Syntax elements prev_intra_luma_pred_flag[x0][y0], mpm_idx[x0][y0] and rem_intra_luma_pred_mode[x0][y0] specify the intra-prediction mode for luma samples. The array indices x0, y0 specify the location of the top-left luma sample of a prediction block relative to the top-left luma sample of the picture. Syntax element prev_intra_luma_pred_flag[x0][y0] indicates a true or false condition and may have a value of 1 or 0. In one example, when prev_intra_luma_pred_flag[x0][y0] is equal to 1, the intra-prediction mode for a current PU is inferred from a neighboring intra-predicted PU.

For example, as indicated in Table 1, if the prev_intra_luma_pred_flag[x0][y0] is equal to 1, a video encoder signals in the encoded bitstream and a video decoder receives from the encoded bitstream the mpm_idx[x0][y0] syntax element. The mpm_idx[x0][y0] is an index into a list of most probable modes (mpm). For instance, the video encoder and the video decoder may each be configured to construct the list of most probable modes. The list of most probable modes identifies intra-prediction modes.

The video decoder may construct the list of most probable modes implicitly (i.e., without receiving signaling from the video encoder indicating which intra-prediction modes are to be included in the list of most probable modes) or may construct the list of most probable modes based on received signaling from the video encoder. In either example, the list of most probable modes on the video encoder side and the list of most probable modes on the video decoder side may identify the same intra-prediction modes, and in the same order. In some examples, the video encoder and the video decoder may construct the list of most probable modes for each intra-predicted PU of the CU, and the list of most probable modes for two or more PUs of the CU may be different (i.e., there may be respective lists of most probable modes for the PUs of the CU). However, the techniques described in this disclosure are not so limited.

There may be various ways in which the video encoder and the video decoder may construct the list of most probable modes. As one example, the video encoder and the video decoder are configured to identify a fixed number of intra-prediction modes in the list of most probable modes (i.e., identify three intra-prediction modes). The video encoder and the video decoder evaluate the intra-prediction mode of a first neighboring PU that neighbors the current PU (e.g., the PU being intra-predicted) and a second neighboring PU that neighbors the current PU. Examples of the first and second neighboring PUs include the left, top-left, right, bottom, and generally any neighboring PU.

The video encoder and the video decoder include the intra-prediction modes of the first and second neighboring PUs in the list of most probable modes. If one or both of the first and second neighboring PUs are not intra-predicted, the video encoder and video decoder may identify the DC intra-prediction mode, as one example, in the list of most probable modes in the corresponding locations within the list of most probable modes for the first and second neighboring PUs.

To determine the third intra-prediction mode in the list of intra-prediction modes, the video encoder and the video decoder may determine whether the intra-prediction modes for the first and second neighboring PUs is the same (including whether the DC intra-prediction mode was selected if not intra-predicted). If the intra-prediction modes for the first and second neighboring PUs are the same, the video encoder and the video decoder may implement a first technique to identify the third intra-prediction mode in the list of intra-prediction modes. In some examples, if the intra-prediction modes for the first and second neighboring PUs is the same, the video encoder and the video decoder may identify one of the intra-prediction modes in the list of most probable modes and identify the second and third intra-prediction modes in the list of most probable modes using the first technique (or another technique, rather than the first technique). If the intra-prediction modes for the first and second neighboring PUs are different, the video encoder and the video decoder may implement a second technique to identify the third intra-prediction mode.

There may be various examples of the first and second techniques for identifying the third intra-prediction mode, and the techniques described in this disclosure are not limited to any one particular technique. In some examples, the third intra-prediction mode based on either the first or second technique need not necessarily be an intra-prediction mode of a neighboring PU. In some examples, the third intra-prediction mode based on either the first or second technique may be based on an intra-prediction mode of a neighboring PU.

The mpm_idx[x0][y0] is the index into the list of most probable modes that the video encoder signals and the video decoder receives. In this example, from the mpm_idx[x0][y0] value the video decoder may be configured to determine the intra-prediction mode for the current PU. In some examples, because the list of most probable modes is based on the intra-prediction modes of neighboring PUs (e.g., the first and second neighboring PUs), the mpm_idx[x0][y0] syntax element may, in some cases, be used to identify the specific neighboring PU to be used for inferring the intra-prediction mode for the current PU. For instance, as one example, if the mpm_idx[x0][y0] is an index into the list of most probable modes that identifies the intra-prediction mode associated with the first neighboring PU, the video decoder may be considered as identifying the first neighboring PU as the PU from which the intra-prediction mode of the current PU is to be inferred.

For example, referring to FIG. 1, the intra-prediction mode for $PU_1$ may be equal to the intra-prediction mode for $PU_0$ for the INTRA_N×N example. The syntax element mpm_idx[x0][y0] may indicate which neighboring PU within a set of neighboring intra-predicted PUs a current PU may infer an intra-prediction mode from. In this example, if prev_intra_luma_pred_flag[x0][y0] is equal to 0, the intra-prediction mode is not inferred from a neighboring PU, but is indicated by the syntax element rem_intra_luma_pred_mode[x0][y0].

The rem_intra_luma_pred_mode[x0][y0] syntax element may specify the particular intra-prediction mode for the current PU. In some examples, the rem_intra_luma_pred_mode[x0][y0] syntax element may specify an intra-prediction mode for the current PU is not included in the intra-prediction modes identified by the list of most probable modes. For instance, the rem_intra_luma_pred_mode[x0][y0] syntax element identifies a remaining intra-prediction mode from all possible intra-prediction modes when the intra-prediction modes identified in the list of most probable modes are excluded. However, the techniques of this disclosure are not so limited.

The syntax element intra_chroma_pred_mode[x0][y0] specifies the intra-prediction mode for the chroma samples of a CU. A chroma intra-prediction may be based on a luma intra-prediction mode. A syntax element chroma_pred_from_luma_enabled_flag may indicate whether the intra-prediction mode for chroma is based on the intra-prediction mode for luma.

In HEVC WD6, possible intra-prediction modes include, planar prediction mode (predMode=0), a DC prediction (predMode=1) 33 angular prediction modes (predMode=2, . . . , 34), and a prediction mode for a chroma component that infers an intra-prediction mode from a luma prediction mode (predMode=35). Thus, for a luma component, depending on the value of prev_intra_luma_pred_flag, the mpm_idx syntax element may indicate an index into the list of most probable modes, where each entry of the list of most probable modes identifies one of 35 possible intra-prediction modes, or the rem_intra_luma_pred_mode may indicate one of 35 possible intra-prediction modes (excluding those intra-prediction modes identified in the list of most probable modes, in some examples). In one example, the syntax element rem_intra_luma_pred_mode may have an integer value of 0 to 31 and may be coded using a fixed length binary coding method and the syntax element mpm_idx may have an integer value of 0 to 2 (e.g., to identify one of the three entries in the list of most probable modes) and may be coded using a truncated unary coding method. Further, for the chroma components intra_chroma_pred_mode and one or more other syntax elements may indicate one of 36 possible intra-prediction modes. In one example, the syntax element intra_chroma_pred_mode may have an integer value of 0 to 5. A more detailed description of how each of syntax elements mpm_idx, rem_intra_luma_pred_mode, and intra_chroma_pred_mode identify particular intra-prediction modes is provided in HEVC WD6 and for the sake of brevity is repeated herein. However, it should be noted that the techniques described herein may be generally applied to contemplated variations of syntax elements mpm_idx, rem_intra_luma_pred_mode, and intra_chroma_pred_mode.

As described above, a video coding standard may entropy code syntax elements according to a CABAC technique. To apply CABAC coding to a syntax element, a video coder may perform binarization on a syntax element. Binarization refers to the process of converting a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, exponential Golomb coding, and Golomb-Rice coding. For example, binarization may include representing the integer value of 5 as 00000101 using an 8-bit fixed length technique or as 11110 using a unary coding technique.

After binarization, a video coder may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, the video coder may arithmetically code that bin based on the context. Bins coded using a regular CABAC coding may be referred to as "CABAC bins."

Further, rather than performing regular CABAC encoding on all syntax elements bins, a video coder may code some syntax elements bins using bypass CABAC coding. Bypass coding refers to the process of arithmetically encoding a bin without using an adaptive context. That is, the bypass coding engine does not select contexts and may assume a probability of 0.5 for both symbols (0 and 1). Although bypass coding may not be as bandwidth-efficient as CABAC coding, it may be computationally less expensive to perform bypass coding on a bin rather than to perform regular CABAC coding on the bin. Further, performing bypass coding may allow for a higher degree of parallelization and throughput. Bins coded using bypass coding may be referred to as "bypass bins."

When a CABAC coder is implemented it may include a regular coding engine to perform regular CABAC coding and a bypass coding engine to perform bypass coding. If a bin is CABAC-coded, the regular CABAC encoding engine is used to code this bin. The regular CABAC encoding engine may need more than two processing cycles to code a single bin. However, with proper pipeline design, a regular CABAC encoding engine may only need n+M cycles to encode n bins, where M is the overhead to start the pipeline. M is usually greater than 0.

At the start of the CABAC coding process (i.e., every switch from bypass mode to regular), pipeline overhead is introduced. If a bin is bypass-coded, the bypass encoding engine is used to code this bin. The bypass coding engine may be expected to need only one cycle to code an n-bit syntax element, where n may be greater than one. Thus, the total number of cycles to code a set of bypass bins and CABAC bins may be reduced if all of the bypass bins within the set are coded together and all of the CABAC bins within the set are coded together. In particular, coding the bypass bins together before or after transitioning to CABAC coding can save the overhead required to restart the CABAC coding engine.

As described above, a CU with an INTRA_NxN PU structure may have four luma intra prediction modes and thus four sets of syntax elements prev_intra_luma_pred_flag, mpm_idx and rem_intra_luma_pred_mode. Among these three syntax elements, in one example, only prev_intra_luma_pred_flag is CABAC-coded and both mpm_idx and rem_intra_luma_pred_mode are bypass-coded. Again, bypass coding may refer to coding of bins with a non-CABAC process, i.e., outside of the CABAC engine. Examples of non-CABAC coding that may be used in bypass coding include Golomb coding, exponential Golomb coding, and Golomb-Rice coding.

As described above, a CU with an INTRA_NxN PU structure may have one chroma intra prediction mode that is used for all fours PUs. The chroma intra prediction mode may be based on the luma intra prediction modes. Table 2 shows the binarization for the syntax element intra_chroma_pred_mode as one example. The binarization results in one or more bins to represent the corresponding value of intra_chroma_pred_mode. The bins that are underlined are CABAC-coded and the rest of the bins are bypass-coded in this example. As illustrated in Table 2, the binarization of intra_chroma_pred_mode and whether a particular bin is CABAC coded or bypassed coded is based on the value of chroma_pred_from_luma_enable_flag. Thus, the binarization of a syntax element and whether a particular bin is CABAC coded or bypassed coded may be based on the value of another syntax element (e.g., chroma_pred_from_luma_enable_flag).

TABLE 2

Binarization of intra_chroma_pred_mode depending on chroma_pred_from_luma_enabled_flag

| Value of intra_chroma_pred_mode | chroma_pred_from_luma_enabled_flag = 1 | chroma_pred_from_luma_enabled_flag = 0 |
|---|---|---|
| 5 | 0 | n/a |
| 4 | 10 | 0 |
| 0 | 1100 | 100 |
| 1 | 1101 | 101 |
| 2 | 1110 | 110 |
| 3 | 1111 | 111 |

Tables 3 and 4 below represent the coding structures for syntax elements identifying the luma and chroma prediction modes for a CU in some examples. Table 3 illustrates the coding of syntax elements for an INTRA_2Nx2N PU structure and Table 4 illustrates the coding of an INTRA_NxN PU structure. In Tables 3 and 4, the syntax element intra_chroma_pred_mode is represented as syntax elements chroma_mode_cabac_bins and chroma_mode_bypass_bins, where chroma_mode_cabac_bins denotes the bins that are CABAC-coded and chroma_mode_bypass_bins denotes the bins that are bypass coded, as provided in Table 2. Tables 3 and 4 identify whether the syntax elements are code using a CABAC mode or a bypass mode. Syntax elements are output to a CABAC coding engine and typically entropy coded in the order they are presented in Tables 3 and 4. Further, as illustrated in Table 4, there are four sets of prev_intra_luma_pred_flag, mpm_idx and rem_intra_luma_pred_mode, each corresponding to one of four PUs, and one chroma mode indication that is shared by all four of the PUs.

TABLE 3

Intra mode coding structure for intra_2Nx2N

| | |
|---|---|
| prev_intra_luma_pred_flag[ x0 ][ y0 ] | (CABAC-CODED) |
| if( prev_intra_luma_pred_flag[ x0 ][ y0 ] ) | |
|   mpm_idx[ x0 ][ y0 ] | (BYPASS-CODED) |
| Else | |
|   rem_intra_luma_pred_mode[ x0 ][ y0 ] | (BYPASS-CODED) |
| chroma_mode_cabac_bins [ x0 ][ y0 ] | (CABAC-CODED) |
| chroma_mode_bypass_bins[ x0 ][ y0 ] | (BYPASS-CODED) |

TABLE 4

Intra mode coding structure for intra_NxN

| | |
|---|---|
| prev_intra_luma_pred_flag[ x0 ][ y0 ] | (CABAC-CODED) |
| if( prev_intra_luma_pred_flag[ x0 ][ y0 ] ) | |
|   mpm_idx[ x0 ][ y0 ] | (BYPASS-CODED) |
| Else | |
|   rem_intra_luma_pred_mode[ x0 ][ y0 ] | (BYPASS-CODED) |
| //CODING OF LUMA FOR FIRST PU | |
| prev_intra_luma_pred_flag[ x1 ][ y0 ] | (CABAC-CODED) |
| if( prev_intra_luma_pred_flag[ x1 ][ y0 ] ) | |
|   mpm_idx[ x1 ][ y0 ] | (BYPASS-CODED) |
| Else | |
|   rem_intra_luma_pred_mode[ x1 ][ y0 ] | (BYPASS-CODED) |
| //CODING OF LUMA FOR SECOND PU | |
| prev_intra_luma_pred_flag[ x0 ][ y1 ] | (CABAC-CODED) |
| if( prev_intra_luma_pred_flag[ x0 ][ y1 ] ) | |
|   mpm_idx[ x0 ][ y1 ] | (BYPASS-CODED) |
| Else | |
|   rem_intra_luma_pred_mode[ x0 ][ y1 ] | (BYPASS-CODED) |
| //CODING OF LUMA FOR THIRD PU | |
| prev_intra_luma_pred_flag[ x1 ][ y1 ] | (CABAC-CODED) |
| if( prev_intra_luma_pred_flag[ x1 ][ y1 ] ) | |
|   mpm_idx[ x1 ][ y1 ] | (BYPASS-CODED) |
| Else | |
|   rem_intra_luma_pred_mode[ x1 ][ y1 ] | (BYPASS-CODED) |
| //CODING OF LUMA FOR FOURTH PU | |
| chroma_mode_cabac_bins [ x0 ][ y0 ] | (CABAC-CODED) |
| chroma_mode_bypass_bins[ x0 ][ y0 ] | (BYPASS-CODED) |
| //CODING OF CHROMA FOR ALL PUs | |

As illustrated in Tables 3 and 4, syntax elements that are CABAC-coded are interleaved with syntax elements that are bypass-coded, which as described above may increase the total number of cycles required to entropy encode all of the syntax elements in Tables 3 and 4, e.g., due to setup overhead in restarting the CABAC coding engine. As illustrated in Table 4, the problem is compounded if a CU contains multiple PUs. In order to reduce the total pipeline overhead and the total number of cycles required to encode the syntax elements identifying the intra-prediction modes, certain adjustment on the coding order may be made in accordance with this disclosure.

Figure 2:
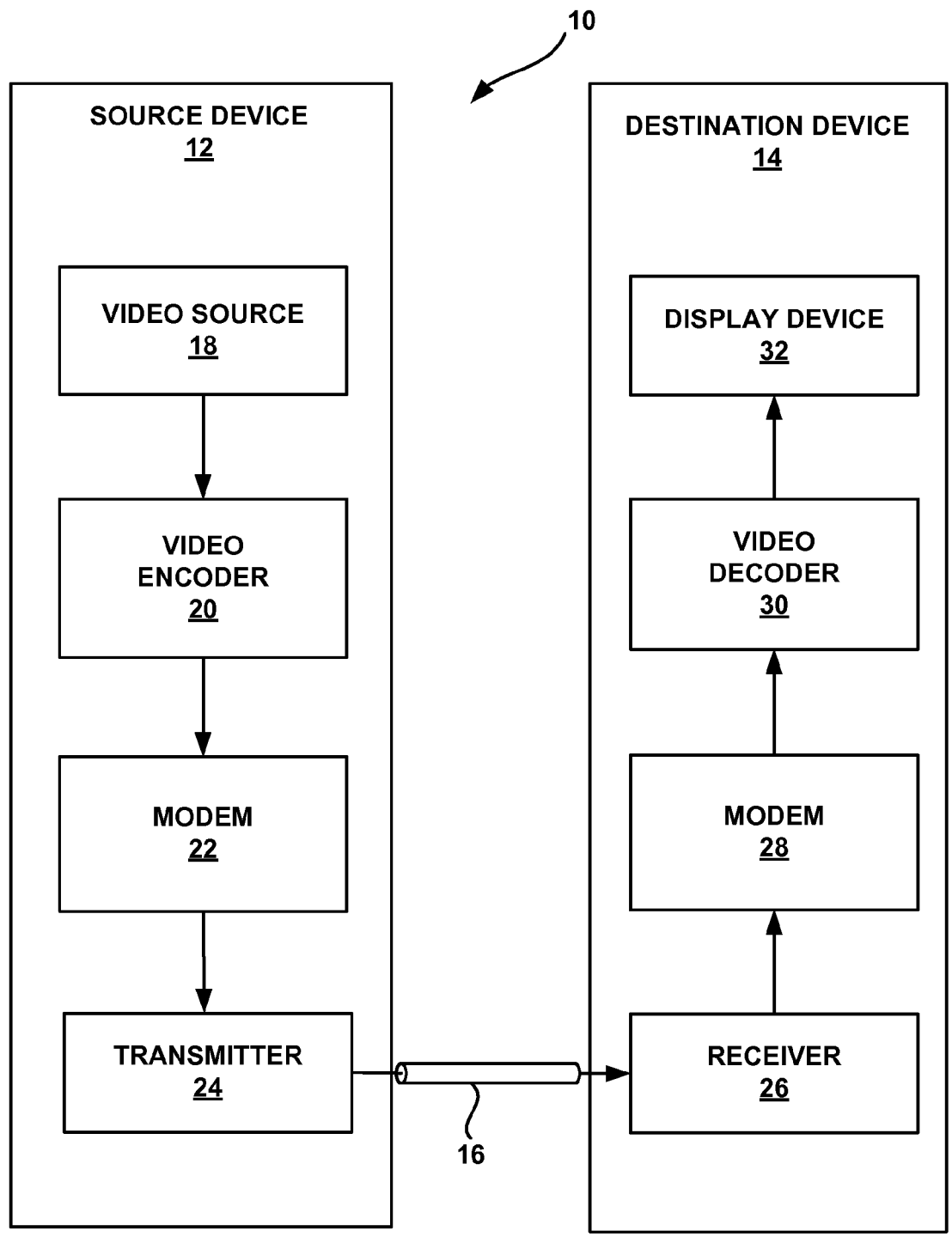
FIG. 2 is a block diagram illustrating an example video encoding and decoding system that may be configured to utilize techniques in accordance with this disclosure.

FIG. 2 is a block diagram illustrating an example video encoding and decoding system 10 that may utilize techniques in accordance with this disclosure. As shown in FIG. 2, system 10 includes a source device 12 that signals encoded video data. In some examples, source device 12 may signal the encoded video data to destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless, wired, or storage media suitable for transmission or storage of encoded video data for subsequent retrieval by destination device 14.

In the example of FIG. 2, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for entropy encoding in a manner that reduces pipeline overhead. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 2 is merely one example. Techniques for entropy encoding a set of flags and a respective syntax element for each flag in a manner that reduces pipeline overhead may be performed by any digital video encoding and/or decoding device. Although generally the techniques of this disclosure are performed by a video coding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to entropy encode syntax elements reduces pipeline overhead. The information communicated over channel 16 may include syntax information defined by video encoder 20, which is also used by video decoder 30, that includes syntax elements that describe characteristics and/or processing of macroblocks and other coded units, for example, groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 2, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. In other examples, source device 12 may store encoded data onto a storage medium, rather than transmitting the data. Likewise, destination device 14 may be configured to retrieve encoded data from a storage medium. In this manner, source device 12 may be configured to generate a computer program product wherein the computer program product includes a video file encoded according to the techniques described herein.

Video encoder 20 and video decoder 30 may operate according to a video compression standard, such as those described herein. The techniques of this disclosure, however, are not limited to any particular coding standard. Although not shown in FIG. 2, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), wireless communication devices that include a video coding device, such as encoder or decoder, discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like. An apparatus including video encoder 20 and/or video decoder 30 may comprise an integrated circuit, a microprocessor, and/or a wireless communication device, such as a cellular telephone.

Video encoder 20 and video decoder 30 may be configured to implement techniques in accordance with this disclosure. Such techniques may reduce pipeline overhead thereby potentially increasing throughput. For example, one cause of pipeline overhead is the overhead associated with the cycles needed to start context adaptive binary arithmetic coding (CABAC). In the techniques described in this disclosure, video encoder 20 entropy encodes a first group of syntax elements using CABAC encoding (e.g., with a regular CABAC engine), and entropy encodes a second group of syntax elements using bypass encoding (e.g., with a bypass engine). Similarly, video decoder 30 entropy decodes the first group of syntax elements using CABAC decoding (e.g., with a regular CABAC engine), and entropy decodes the second group of syntax elements using bypass decoding (e.g., with a bypass decoding engine).

In this way, the syntax elements of the first group that are CABAC encoded are not interleaved with syntax elements of the second group that are bypass encoded in the bitstream. If the CABAC encoded syntax elements and bypass encoded syntax elements were interleaved, then video encoder 20 and video decoder 30 would have to repeatedly restart the CABAC engine.

For example, assume that a first syntax element is to be CABAC encoded and precedes a second syntax element that is to be bypass encoded, and a third syntax element that is to be CABAC encoded follows the second syntax element that is to be bypass encoded. In this example, in which syntax elements that are to be CABAC and bypass encoded are interleaved, video encoder 20 would need to start the CABAC engine for the first syntax element, and then restart the CABAC engine for the third syntax element after encoding the second syntax element with the bypass engine, which wastes cycles.

In the techniques described in this disclosure, by CABAC encoding the first group of syntax elements, and bypass encoding the second group of syntax elements, video encoder 20 may reduce the number of times the CABAC engine is to be started, thereby reducing the number of wasted cycles. Similarly, by CABAC decoding the first group of syntax elements, and bypass decoding the second group of syntax elements, video decoder 30 may reduce the number of times the CABAC engine is to be started, thereby reducing the number of wasted cycles.

As described in more detail, each syntax element of the first group of syntax elements is associated with one PU of the CU, and each syntax element of the second group of syntax elements corresponds to a syntax element of the first group of syntax elements. Each of the first group of syntax elements and the second group of syntax elements includes a plurality of syntax elements. Each of the first group of syntax elements indicates whether an intra-prediction mode of a respective PU (e.g., the PU that corresponds to the syntax element of the first group of syntax elements) is inferred from a neighboring PU. In other words, each of the first group of syntax elements indicates whether an intra-prediction mode of a respective PU is based on an index into a list of most probable modes.

For example, video encoder 20 and video decoder 30 may be configured to construct the list of most probable modes in the example manner described above. Each syntax element in the first group of syntax elements may correspond to one of the PUs in the CU. In this example, a syntax element in the first group of syntax elements (i.e., one of the syntax elements in the plurality of syntax elements of the first group) indicates whether the intra-prediction mode for the PU to which the syntax element corresponds in the CU is based on an index into the list of most probable modes.

If the syntax element of the first group of syntax elements indicates that the intra-prediction mode of the PU, to which it is associated, is based on the index into the list of most probable modes, then a syntax element of the second group of syntax elements, that is associated with the syntax element of the first group of syntax elements, identifies the index into the list of most probable modes. If the syntax element of the first group of syntax elements indicates that the intra-prediction mode of the PU, to which it is associated, is not based on the index into the list of most probable modes, then a syntax element of the second group of syntax elements, that is associated with the syntax element of the first group of syntax elements, indicates the intra-prediction mode.

Figure 3:
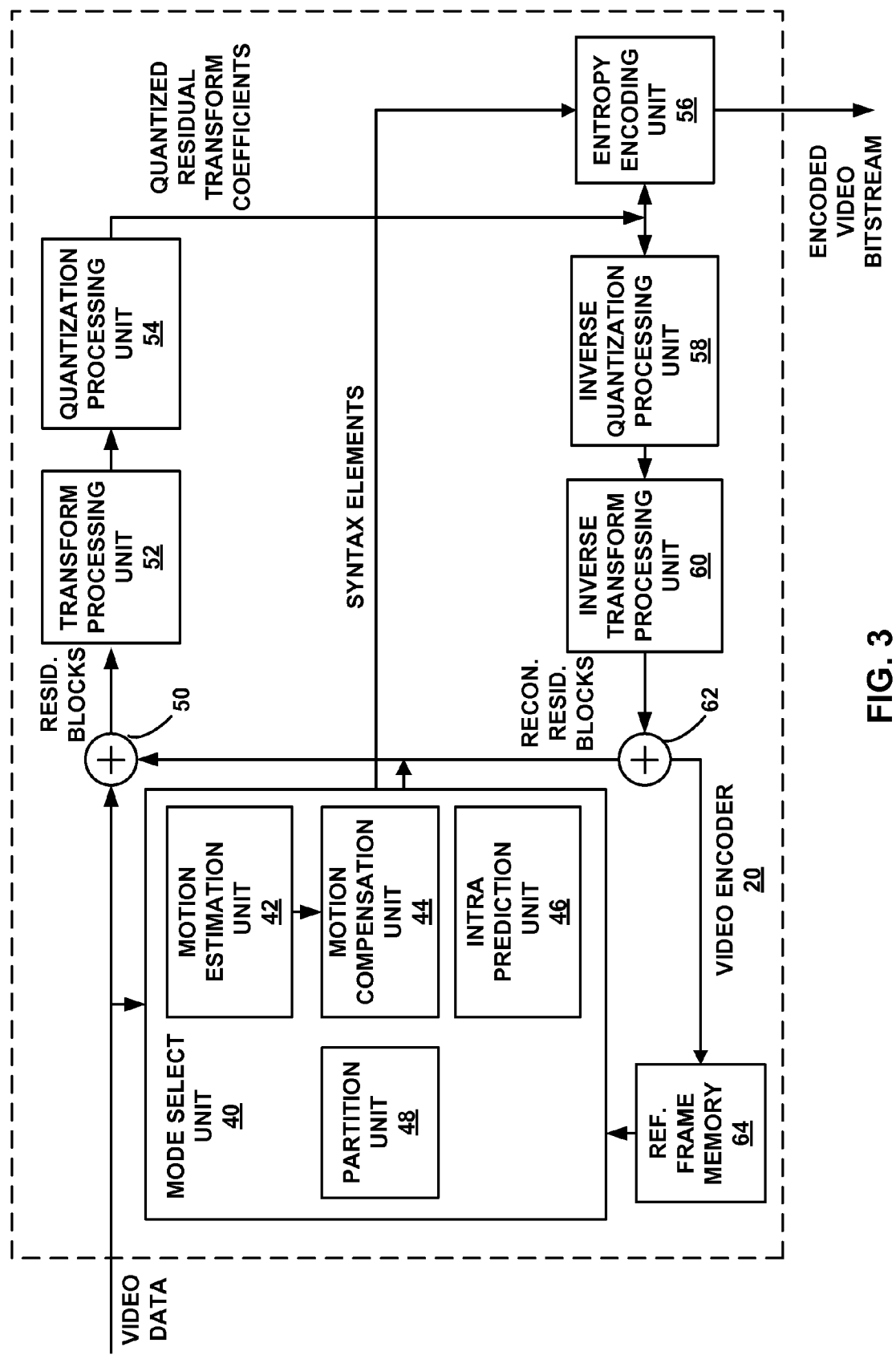
FIG. 3 is a block diagram illustrating an example of a video encoder that may implement techniques for coding predictive syntax elements, in accordance with this disclosure.

FIG. 3 is a block diagram illustrating an example of video encoder 20 that may implement the techniques for encoding video data described herein. In one example, video encoder 20 may be configured to generate a first group of syntax elements and a second group of syntax elements, wherein syntax elements of the second group of syntax elements correspond to respective syntax elements of the first group of syntax elements, and wherein each of the syntax elements of the first group of syntax elements indicates whether an intra-prediction mode of a respective PU in the CU is based on an index into the list of most probable modes. Video encoder 20 may context adaptive binary arithmetic coding (CABAC) encode the first group of syntax elements (e.g., using a regular CABAC engine), subsequent to entropy encoding the first group of syntax elements, bypass encoder the second group of syntax elements (e.g., using a bypass encoding engine), and output the video data that includes the encoded first group of syntax elements and the encoded second group of syntax elements. Each of the first and second group of syntax elements includes a plurality of syntax elements.

Video encoder 20 may perform intra-coding (i.e., intra-prediction encoding) and inter-coding (i.e., inter-prediction encoding) of video blocks within video slices. As shown in FIG. 3, video encoder 20 receives video data, which may be a current video block within a video frame to be encoded, and outputs an encoded video bitstream. Video encoder 20 may further send syntax data, such as block-based syntax data, frame-based syntax data, and GOP-based syntax data, e.g., in a frame header, a block header, a slice header, or a GOP header. The GOP syntax data may describe a number of frames in the respective GOP, and the frame syntax data may indicate an encoding/prediction mode used to encode the corresponding frame.

In the example of FIG. 3, video encoder 20 includes mode select unit 40, reference frame memory 64, summer 50, transform processing unit 52, quantization processing unit 54, and entropy encoding unit 56. Mode select unit 40, in turn, includes motion estimation unit 42, motion compensation unit 44, intra-prediction unit 46, and partition unit 48. For video block reconstruction, video encoder 20 also includes inverse quantization processing unit 58, inverse transform processing unit 60, and summer 62.

During the encoding process, video encoder 20 receives a video frame or slice to be coded. The frame or slice may be divided into multiple video blocks. Motion estimation unit 42 and motion compensation unit 44 perform inter-predictive coding (inter-prediction encoding) of the received video block relative to one or more blocks in one or more reference frames to provide temporal prediction. Intra-prediction unit 46 may alternatively perform intra-predictive coding (intra-prediction encoding) of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provide the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56. For example, mode select unit 40 may provide syntax elements prev_intra_luma_pred_flag, mpm_idx, rem_intra_luma_pred_mode, intra_chroma_pred_mode, and chroma_pred_from_luma_enable_flag, as described above, to entropy encoding unit 56. Further, mode select unit 40 may be configured to arrange syntax elements to prev_intra_luma_pred_flag, mpm_idx, rem_intra_luma_pred_mode, and intra_chroma_pred_mode, such that they are provided to entropy encoding unit 56 in a manner where the number of cycles required to entropy encode the syntax elements is reduced.

For example, video encoder 20, via entropy encoding unit 56, entropy encodes the prev_intra_luma_pred_flag for each PU within a CU using CABAC encoding. In this example, the first group of syntax elements includes a plurality of prev_intra_luma_pred_flag(s) (i.e., one for each PU in the CU). Video encoder 20, via entropy encoding unit 56, entropy encodes the mpm_idx syntax element using bypass encoding if the corresponding prev_intra_luma_pred_flag indicates that the intra-prediction mode for the PU is based on an index into a list of most probable modes, or encodes the rem_intra_luma_pred_mode syntax element if the corresponding prev_intra_luma_pred_flag indicates that the intra-prediction mode for the PU is not based on an index into a list of most probable modes. In this example, the second group of syntax elements includes at least one of one or more mpm_idx syntax elements and one or more rem_intra_luma_pred_mode syntax elements.

In other words, one example of a syntax element in the first group of syntax elements is the prev_intra_luma_pred_flag, one example of a syntax element in the second group of syntax elements is the mpm_idx syntax element, and another example of a syntax element in the second group of syntax elements is the rem_intra_luma_pred_mode syntax element.

Again, the prev_intra_luma_pred_flag indicates whether the intra-prediction mode of luma samples of a PU of the CU is based on an index into a list of most probable modes. The mpm_idx syntax element indicates index into the list of most probable modes if prev_intra_luma_pred_flag indicates that the intra-prediction mode of luma samples the PU of the CU is based on an index into the list of most probable modes. The rem_intra_luma_pred_mode syntax element indicates the intra-prediction mode of luma samples of the PU if prev_intra_luma_pred_flag indicates that the intra-prediction mode of the PU of the CU is not based on an index into the list of most probable modes. The rem_intra_luma_pred_mode syntax element may indicate an intra-prediction mode that is not identified in the list of most probable modes.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes, e.g., based on a rate-distortion analysis. As described above, possible intra-prediction modes may include planar prediction modes, a DC prediction, angular prediction modes, and a prediction mode for a chroma component that infers an intra-prediction mode from a luma prediction mode.

Further, in one example, intra prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra prediction unit 46 may provide information indicative of the selected intra-prediction mode for the block, such as syntax elements, to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

As described above, the intra-prediction syntax elements prev_intra_luma_pred_flag, mpm_idx, rem_intra_luma_pred_mode, intra_chroma_pred_mode, and chroma_pred_from_luma_enable_flag may indicate one or more luma intra-prediction modes for a PU structure and a chroma intra-prediction mode for a PU structure. Further, as described above with respect to Tables 3 and 4, the arrangement of intra-prediction syntax elements prev_intra_luma_pred_flag, mpm_idx, rem_intra_luma_pred_mode, intra_chroma_pred_mode, and chroma_pred_from_luma_enable_flag within a coding structure may determine the total number of cycles required to entropy encode the all of the syntax elements for a PU structure. Thus, in addition to outputting the intra-prediction syntax elements to entropy encoding unit 56 as described above with respect to Tables 3 and 4, intra-prediction unit 46 may be configured to arrange the intra-prediction syntax such that they are output to entropy encoding unit 56 in a manner where the total number of cycles required to entropy encode the syntax elements is reduced. Likewise, with this arrangement, the total number of cycles required to entropy decode the syntax elements at a decoder is reduced.

In one example, intra prediction unit 46 may be configured to arrange CABAC-coded bins of chroma-intra mode syntax elements with CABAC-coded bins of luma intra-mode syntax elements, such that they are coded together. Further, intra prediction unit 46 may arrange bypass-coded bins of luma intra-mode syntax elements with bypass-coded bins of chroma intra-mode syntax elements, such that they may be coded together. Table 5 provides an example coding structure of this arrangement for an INTRA_2N×2N PU structure. Table 6 provides an example coding structure of this arrangement for an INTRA_N×N PU structure. In Tables 5 and 6, the syntax elements may be defined as described above with respect to Tables 3 and 4. However, it should be noted that the syntax elements in Tables 5 and 6 need not necessarily have the same range of values as described above. For example, if video encoder 20 includes fewer or more than 33 intra-predictions modes, the values of the syntax elements may be adjusted accordingly. As illustrated in Tables 5 and 6, syntax element chroma_mode_cabac_bins is arranged such that it is coded prior to mpm_idx and rem_intra_luma_pred_mode.

TABLE 5

Intra-mode coding structure for intra_2N×2N

| | |
|---|---|
| prev_intra_luma_pred_flag[ x0 ][ y0 ] | (CABAC-CODED) |
| chroma_mode_cabac_bins [ x0 ][ y0 ] | (CABAC-CODED) |
| if( prev_intra_luma_pred_flag[ x0 ][ y0 ] ) | |
|   mpm_idx[ x0 ][ y0 ] | (BYPASS-CODED) |
| Else | |
|   rem_intra_luma_pred_mode[ x0 ][ y0 ] | (BYPASS-CODED) |
|   chroma_mode_bypass_bins[ x0 ][ y0 ] | (BYPASS-CODED) |

TABLE 6

Intra-mode coding structure for intra_N×N

| | |
|---|---|
| prev_intra_luma_pred_flag[ x0 ][ y0 ] | (CABAC-CODED) |
| chroma_mode_cabac_bins [ x0 ][ y0 ] | (CABAC-CODED) |
| if( prev_intra_luma_pred_flag[ x0 ][ y0 ] ) | |
|   mpm_idx[ x0 ][ y0 ] | (BYPASS-CODED) |
| Else | |
|   rem_intra_luma_pred_mode[ x0 ][ y0 ] | (BYPASS-CODED) |
|   chroma_mode_bypass_bins[ x0 ][ y0 ] | (BYPASS-CODED) |
| prev_intra_luma_pred_flag[ x1 ][ y0 ] | (CABAC-CODED) |
| if( prev_intra_luma_pred_flag[ x1 ][ y0 ] ) | |
|   mpm_idx[ x1 ][ y0 ] | (BYPASS-CODED) |
| Else | |
|   rem_intra_luma_pred_mode[ x1 ][ y0 ] | (BYPASS-CODED) |
| prev_intra_luma_pred_flag[ x0 ][ y1 ] | (CABAC-CODED) |
| if( prev_intra_luma_pred_flag[ x0 ][ y1 ] ) | |
|   mpm_idx[ x0 ][ y1 ] | (BYPASS-CODED) |
| Else | |
|   rem_intra_luma_pred_mode[ x0 ][ y1 ] | (BYPASS-CODED) |
| prev_intra_luma_pred_flag[ x1 ][ y1 ] | (CABAC-CODED) |
| if( prev_intra_luma_pred_flag[ x1 ][ y1 ] ) | |
|   mpm_idx[ x1 ][ y1 ] | (BYPASS-CODED) |
| Else | |
|   rem_intra_luma_pred_mode[ x1 ][ y1 ] | (BYPASS-CODED) |

In another example, intra-prediction unit 46 may be configured to arrange CABAC-coded bins of intra-mode luma syntax elements for all of the PUs within a CU, such that they may be coded together. Further, intra-prediction unit 46 may arrange bypass-coded bins of luma intra-mode syntax elements such that they may be coded together. Table 7 provides an example coding structure of this arrangement for an INTRA_2N×2N PU structure. Table 8 provides an example coding structure of this arrangement for an INTRA_N×N PU structure. In Tables 7 and 8, the syntax elements may be defined as described above with respect to Tables 5 and 6.

As is illustrated in Table 8, for an INTRA_N×N PU structure, the prev_intra_luma_pred_flag syntax elements for each of the four PUs are coded, then the respective mpm_idx and rem_intra_luma_pred_mode syntax elements for each of the of PUs are coded. The four prev_intra_luma_pred_flag syntax elements may be referred to as a first group of syntax elements for a PU. Thus, intra-prediction unit 46 may be configured to output the first group of syntax elements prior to entropy encoding unit 56, prior to the respective syntax element mpm_idx and rem_intra_luma_pred_mode associated with each of the flags.

TABLE 7

Intra mode coding structure for intra_2Nx2N

| | |
|---|---|
| prev_intra_luma_pred_flag[ x0 ][ y0 ] | (CABAC-CODED) |
| if( prev_intra_luma_pred_flag[ x0 ][ y0 ] ) | |
|   mpm_idx[ x0 ][ y0 ] | (BYPASS-CODED) |
| Else | |
|   rem_intra_luma_pred_mode[ x0 ][ y0 ] | (BYPASS-CODED) |
| chroma_mode_cabac_bins [ x0 ][ y0 ] | (CABAC-CODED) |
| chroma_mode_bypass_bins[ x0 ][ y0 ] | (BYPASS-CODED) |

TABLE 8

Intra-mode coding structure for intra_NxN

| | |
|---|---|
| prev_intra_luma_pred_flag[ x0 ][ y0 ] | (CABAC-CODED) |
| prev_intra_luma_pred_flag[ x1 ][ y0 ] | (CABAC-CODED) |
| prev_intra_luma_pred_flag[ x0 ][ y1 ] | (CABAC-CODED) |
| prev_intra_luma_pred_flag[ x1 ][ y1 ] | (CABAC-CODED) |
| if( prev_intra_luma_pred_flag[ x0 ][ y0 ] ) | |
|   mpm_idx[ x0 ][ y0 ] | (BYPASS-CODED) |
| Else | |
|   rem_intra_luma_pred_mode[ x0 ][ y0 ] | (BYPASS-CODED) |
| if( prev_intra_luma_pred_flag[ x1 ][ y0 ] ) | |
|   mpm_idx[ x1 ][ y0 ] | (BYPASS-CODED) |
| Else | |
|   rem_intra_luma_pred_mode[ x1 ][ y0 ] | (BYPASS-CODED) |
| if( prev_intra_luma_pred_flag[ x0 ][ y1 ] ) | |
|   mpm_idx[ x0 ][ y1 ] | (BYPASS-CODED) |
| Else | |
|   rem_intra_luma_pred_mode[ x0 ][ y1 ] | (BYPASS-CODED) |
| if( prev_intra_luma_pred_flag[ x1 ][ y1 ] ) | |
|   mpm_idx[ x1 ][ y1 ] | (BYPASS-CODED) |
| Else | |
|   rem_intra_luma_pred_mode[ x1 ][ y1 ] | (BYPASS-CODED) |
| chroma_mode_cabac_bins [ x0 ][ y0 ] | (CABAC-CODED) |
| chroma_mode_bypass_bins[ x0 ][ y0 ] | (BYPASS-CODED) |

In yet another example, intra-prediction unit 46 may be configured to arrange all CABAC-coded bins of both luma and chroma intra-mode syntax elements for all PUs in a coding unit, such that they may be coded together. Further, intra prediction unit 46 may be configured to arrange all bypass-coded bins of both luma and chroma intra mode such that they may be coded together. Table 9 provides an example coding structure of this arrangement for an INTRA_2N×2N PU structure. Table 10 provides an example coding structure of this arrangement for an INTRA_N×N PU structure. In Tables 9 and 10 the syntax elements may be defined as described above with respect to Tables 5 and 6.

TABLE 9

Intra-mode coding structure for intra_2Nx2N

| | |
|---|---|
| prev_intra_luma_pred_flag[ x0 ][ y0 ] | (CABAC-CODED) |
| chroma_mode_cabac_bins [ x0 ][ y0 ] | (CABAC-CODED) |
| if( prev_intra_luma_pred_flag[ x0 ][ y0 ] ) | |
|   mpm_idx[ x0 ][ y0 ] | (BYPASS-CODED) |
| Else | |
|   rem_intra_luma_pred_mode[ x0 ][ y0 ] | (BYPASS-CODED) |
| chroma_mode_bypass_bins[ x0 ][ y0 ] | (BYPASS-CODED) |

TABLE 10

Intra-mode coding structure for intra_NxN

| | |
|---|---|
| prev_intra_luma_pred_flag[ x0 ][ y0 ] | (CABAC-CODED) |
| prev_intra_luma_pred_flag[ x1 ][ y0 ] | (CABAC-CODED) |
| prev_intra_luma_pred_flag[ x0 ][ y1 ] | (CABAC-CODED) |
| prev_intra_luma_pred_flag[ x1 ][ y1 ] | (CABAC-CODED) |
| chroma_mode_cabac_bins [ x0 ][ y0 ] | (CABAC-CODED) |
| if( prev_intra_luma_pred_flag[ x0 ][ y0 ] ) | |
|   mpm_idx[ x0 ][ y0 ] | (BYPASS-CODED) |
| Else | |
|   rem_intra_luma_pred_mode[ x0 ][ y0 ] | (BYPASS-CODED) |
| if( prev_intra_luma_pred_flag[ x1 ][ y0 ] ) | |
|   mpm_idx[ x1 ][ y0 ] | (BYPASS-CODED) |
| Else | |
|   rem_intra_luma_pred_mode[ x1 ][ y0 ] | (BYPASS-CODED) |
| if( prev_intra_luma_pred_flag[ x0 ][ y1 ] ) | |
|   mpm_idx[ x0 ][ y1 ] | (BYPASS-CODED) |
| Else | |
|   rem_intra_luma_pred_mode[ x0 ][ y1 ] | (BYPASS-CODED) |
| if( prev_intra_luma_pred_flag[ x1 ][ y1 ] ) | |
|   mpm_idx[ x1 ][ y1 ] | (BYPASS-CODED) |
| Else | |
|   rem_intra_luma_pred_mode[ x1 ][ y1 ] | (BYPASS-CODED) |
| chroma_mode_bypass_bins[ x0 ][ y0 ] | (BYPASS-CODED) |

It should be noted that in Tables 6 through Table 10, the row in which a syntax element is presented in a table may correspond to the order in which it is entropy encoded by an entropy encoder. In some cases, no intermediate entropy encoding may occur between adjacent rows in Tables 6 through Table 10. The terms "group" and "grouping" herein may generally refer to placing elements closely together, e.g., within a syntax table within a video coding unit such as a picture, slice, CU, or the like. In cases where an operation is performed on syntax elements included in a group, in some cases the elements may be placed so closely together that the operation is not performed on elements outside of the group until the operation is completed on all elements within the group (i.e., no interleaving between the different groups). In some cases, the bins in a group may be presented consecutively and coded in an order or sequence, i.e., one after the other.

Referring again to FIG. 3, video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Video encoder 20 may be configured to perform inverse quantization and inverse transformation to store decoded blocks to be used as reference for predicting subsequent blocks, e.g., in the same frame or frames to be temporally predicted. Inverse quantization processing unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64.

Following quantization, entropy encoding unit 56 entropy encodes the quantized transform coefficients. Further, entropy encoding unit 56 entropy encodes syntax elements, such as the predictive syntax elements described above. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy encoding, a context may be based on neighboring blocks. Following the entropy encoding by entropy encoding unit 56, the encoded bitstream may be transmitted to another device (e.g., video decoder 30) or archived for later transmission or retrieval.

Figure 4:
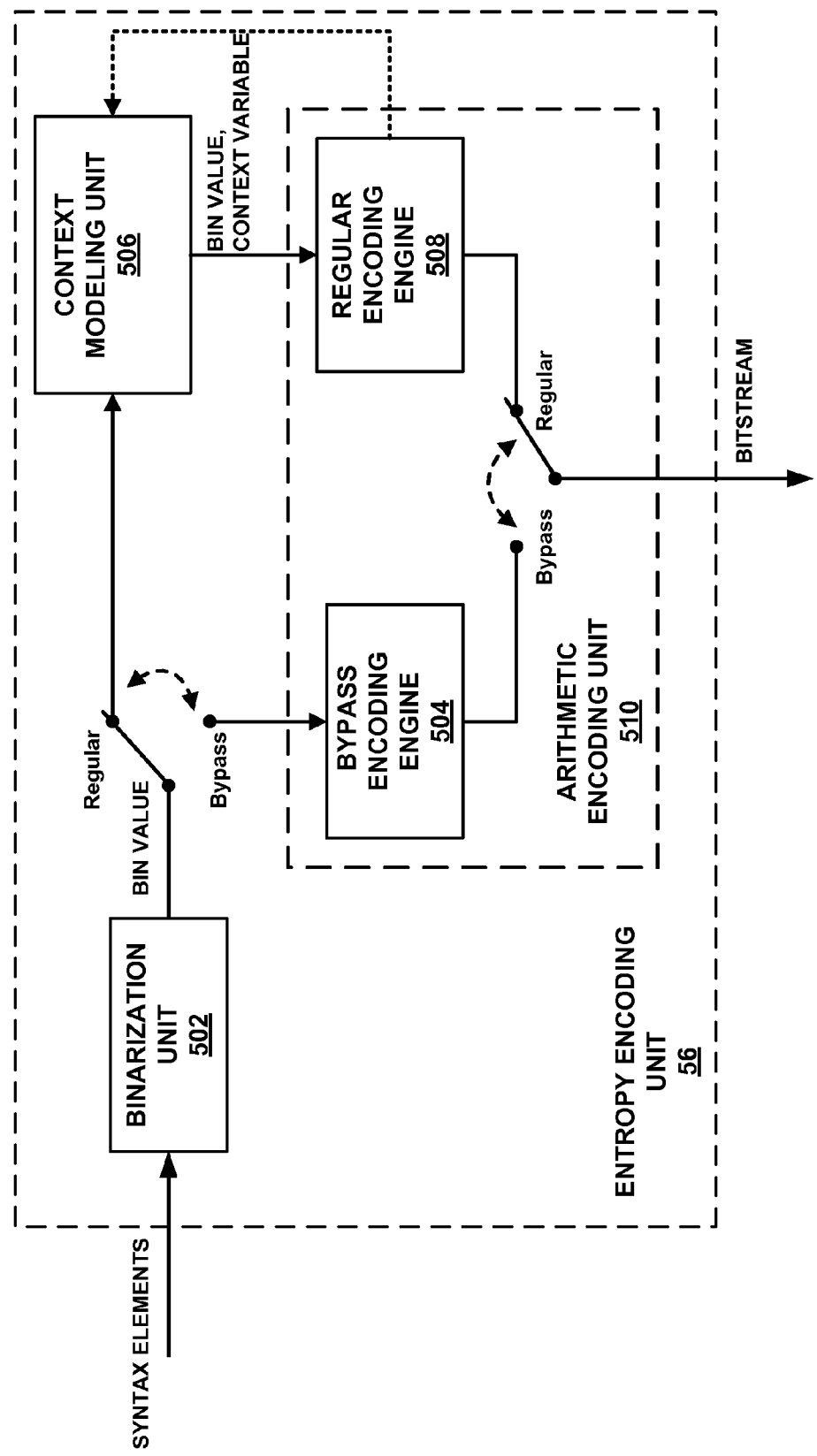
FIG. 4 is a block diagram illustrating an example of an entropy encoder that may implement techniques for entropy encoding predictive syntax elements in accordance with this disclosure.

FIG. 4 is a block diagram that illustrates an example entropy encoding unit 56 that may implement the techniques described in this disclosure. In one example, entropy encoding unit 56 illustrated in FIG. 4 may be a CABAC encoder. The example entropy encoding unit 56 may include a binarization unit 502, an arithmetic encoding unit 510, which includes a bypass encoding engine 504 and a regular encoding engine 508, and a context modeling unit 506.

Entropy encoding unit 56 may receive one or more syntax elements, such as the intra-prediction syntax elements prev_intra_luma_pred_flag, mpm_idx, rem_intra_luma_pred_ mode, intra_chroma_pred_mode, and chroma_pred_from_ luma_enable_flag, described above. The order in which syntax elements are received by entropy encoding unit 56 may be defined according to a coding structure, such as the example coding structures described above with respect to Tables 3 through 10.

Binarization unit 502 receives a syntax element and produces a bin string (i.e., binary string). Binarization unit 502 may use, for example, any one or combination of the following techniques to produce a bin string: fixed length coding, unary coding, truncated unary coding, truncated Rice coding, Golomb coding, exponential Golomb coding, and Golomb-Rice coding. Further, in some cases, binarization unit 502 may receive a syntax element as a binary string and simply pass-through the bin values. In one example, binarization unit 502 receives syntax element intra_chroma_pred_mode and produces a bin string based on the value of chroma_pred_from_luma_enable_flag according to the example described above with respect to Table 2.

Arithmetic encoding unit 510 is configured to receive a bin string from binarization unit 502 and perform arithmetic encoding on the bin string. As shown in FIG. 4, arithmetic encoding unit 510 may receive bin values from a bypass path or the regular coding path. Bin values that follow the bypass path may be bins values identified as bypass coded and bin values that follow the regular encoding path may be identified as CABAC-coded. Consistent with the CABAC process described above, in the case where arithmetic encoding unit 510 receives bin values from a bypass path, bypass encoding engine 504 may perform arithmetic encoding on bin values without utilizing an adaptive context assigned to a bin value. In one example, bypass encoding engine 504 may assume equal probabilities for possible values of a bin.

In the case where arithmetic encoding unit 510 receives bin values through the regular path, context modeling unit 506 may provide a context variable (e.g., a context state), such that regular encoding engine 508 may perform arithmetic encoding based on the context assignments provided by context modeling unit 506. The context assignments may be defined according to a video coding standard, such as HEVC. The context models may be stored in memory. Context modeling unit 506 may include a series of indexed tables and/or utilize mapping functions to determine a context and a context variable for a particular bin. After encoding a bin value, regular encoding engine 508 may update a context based on the actual bin values.

Further, in one example entropy encoding unit 56 may be configured to encode bins based on the order it receives syntax elements from mode select unit 40. As described above, the order may be defined according to a coding structure, such as the example coding structures described above with respect to Tables 3 through 10. The order in which the entropy encoding unit 56 receives syntax elements within a set of syntax elements may determine the total number of cycles that entropy encoding unit 56 requires to encode the set of syntax elements.

In one example, the regular encoding engine 508 may require more than two cycles to code a single bin. Further, in one example, the regular encoding engine 508 may require n+M cycles to encode n bins, where M is the overhead to start the pipeline. M is usually greater than 0. At the start of the CABAC encoding process (e.g., a switch from bypass mode to regular), pipeline overhead M is introduced. In one example, bypass encoding engine 504 may require one cycle to code an n-bit syntax element, where n is greater than zero.

Thus, the total number of cycles that arithmetic encoding unit 510 requires to encode a set of bypass bins and CABAC bins may be based on the number of times pipeline overhead M is introduced. For example, if arithmetic encoding unit 510 were to encode the predictive syntax elements as arranged in Table 4, pipeline overhead may be introduced five times and arithmetic encoding unit 510 may require a minimum of 5*M cycles to encode the bins of the syntax elements. However, if arithmetic encoding unit 510 were to encode the predictive syntax elements as arranged in Table 8, pipeline overhead may only be introduced twice and arithmetic encoding unit 510 pipeline overhead may be reduced to 2*M cycles.

It should be noted that a video frame coded according to HEVC may include on the order of tens of thousands of PUs. Thus, the order in which intra-prediction syntax elements are arranged in a coding structure may have a significant effect on the number of cycles a video coder requires to code video data. Further, it should be noted that although the example entropy encoding unit 56 illustrated in FIG. 4 is described as switching from a by-pass encoding operation to a regular encoding operation, in some cases these operations may be performed in parallel. However, in this case, the order in which entropy encoding unit 56 receives bypass and CABAC coded syntax elements may still determine the total number of cycles required to entropy encode the syntax elements. The overhead comes from context-switching. Since the bins coded in bypass-mode could result in several different syntax elements for the next CABAC-coded bins, it is difficult to pre-fetch the necessary context (load the context buffer) in order to reduce the pipeline overhead.

Figure 5:
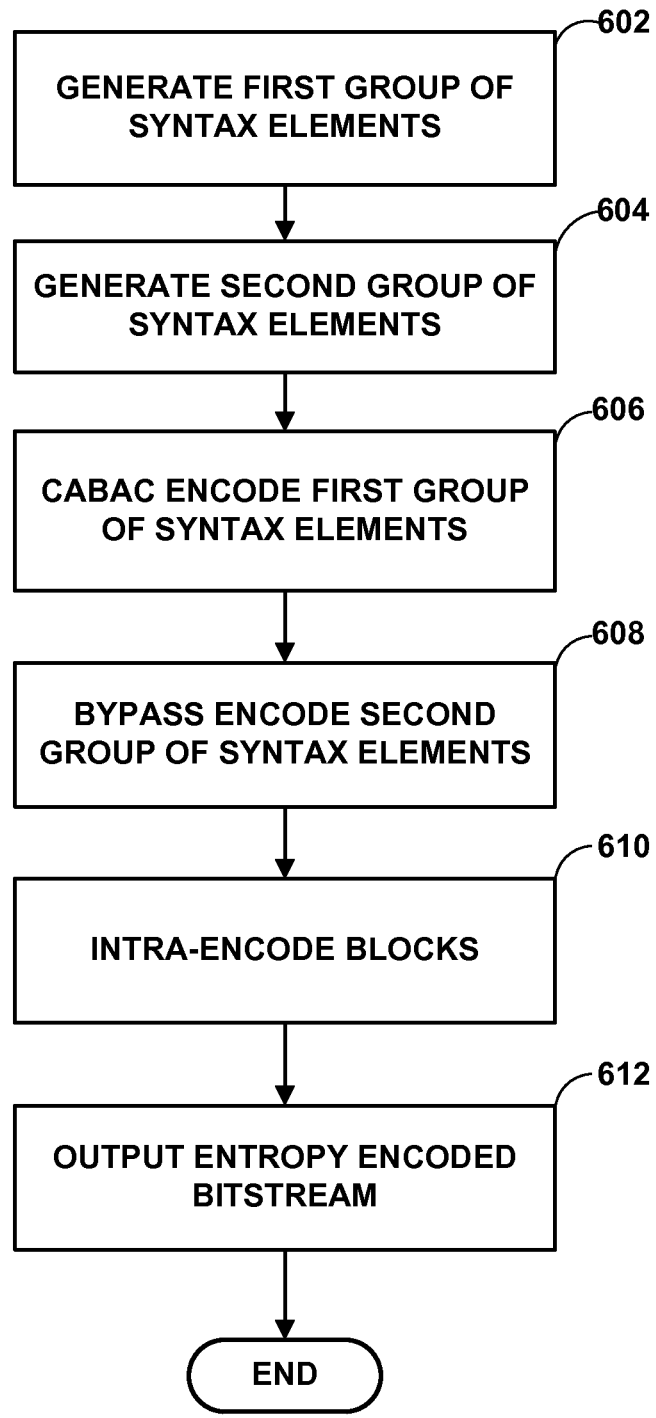
FIG. 5 is a flowchart illustrating encoding predictive syntax elements according to the techniques of this disclosure.

FIG. 5 is a flowchart illustrating an example of encoding video data according to the techniques of this disclosure. Although the process in FIG. 5 is described below as generally being performed by video encoder 20, the process may be performed by any combination of video encoder 20, mode select unit 40 and/or entropy encoding unit 56.

As illustrated in FIG. 5, video encoder 20 generates a first group of syntax elements (602). In one example, a syntax element within the first group indicates whether a prediction mode of a respective prediction unit (PU) is based on an index into a list of most probable modes. In one example, the first group of syntax elements includes four of syntax element prev_intra_luma_pred_flag corresponding to PUs in an INTRA_N×N PU structure. Video encoder 20 generates a second group of syntax elements (604). In one example, a respective syntax element may be either of syntax elements mpm_idx or rem_intra_luma_pred_mode, as described above. Syntax elements of the second group correspond to respective syntax elements of the first group.

Video encoder 20 CABAC encodes the first group of syntax elements (e.g., using a regular CABAC engine) (606). Subsequent to CABAC encoding the first group of syntax elements, video encoder 20 bypass encodes the second group of syntax elements (e.g., using the bypass encoding engine) (608). Video encoder 20 may intra-encode the PUs of the CU based on the first and second groups of syntax elements (610). Video encoder 20 may output the video data, in the bitstream, that includes the encoded first group of syntax elements and the encoded second group of syntax elements (612). Video encoder 20 also outputs the residual information for intra-encoded PUs in the bitstream.

As described above, examples of the first group of syntax elements include a plurality of flags (e.g., the prev_intra_luma_pred_flag syntax elements). A flag of the plurality of flags may be the syntax element of the first group of syntax elements that indicates whether the intra-prediction mode of luma samples of the respective PU is based on an index into the list of most probable modes.

In some examples, the second group of syntax elements includes a first syntax element that indicates the index into the list of most probable modes if the corresponding syntax element in the first group of syntax elements indicates that the intra-prediction mode of the luma samples of the respective PU is based on the index into the list of most probable modes. For example, if the prev_intra_luma_pred_flag syntax element for the respective PU indicates that the intra-prediction mode for the respective PU is based on an index into a list of most probable modes, then the corresponding mpm_idx syntax element for the respective PU indicates the index into the list of most probable modes. In this example, the mpm_idx syntax element is considered as the first syntax element in the second group of syntax elements.

In some examples, the second group of syntax elements includes a second syntax element that indicates the intra-prediction mode for the respective PU if the corresponding syntax element in the first group of syntax elements indicates that the intra-prediction mode of the luma samples of the respective PU is not based on the index into the list of most probable modes. For example, if the prev_intra_luma_pred_flag syntax element for the respective PU indicates that the intra-prediction mode for the respective PU is not based on an index into a list of most probable modes, then the corresponding rem_intra_luma_pred_mode syntax element for the respective PU indicates the intra-prediction mode. In this example, the rem_intra_luma_pred_mode syntax element is considered as the second syntax element in the second group of syntax elements.

As described above, the list of most probable modes that video encoder 20 constructs identifies one or more intra-prediction modes of one or more neighboring PUs. In some examples, video encoder 20 may output all syntax elements of the first group of syntax elements for the PUs of the CU before outputting any syntax elements of the second group of syntax elements for the PUs of the CU. In some examples, video encoder 20 may CABAC encode all syntax elements of the first group of syntax elements prior to bypass encoding any syntax element of the second group of syntax elements.

It should be noted that in some examples, an entropy encoder may be an entropy encoder included within video encoder 20, such as entropy encoding unit 56. In this case, the term outputting may refer to one component within video encoder 20 outputting data to another component within video encoder 20. Further, in other examples, an entropy encoder may be external to video encoder 20. In one example, video encoder 20 outputs the set of flags and respective syntax elements, such that the groups of syntax elements are arranged in a sequence prior to the respective syntax elements. In one example, video encoder 20 may arrange the syntax elements according to the coding structure illustrated in Table 8. A video decoder may receive the entropy encoded bitstream and reconstruct video data using the entropy encoded bitstream.

Figure 6:
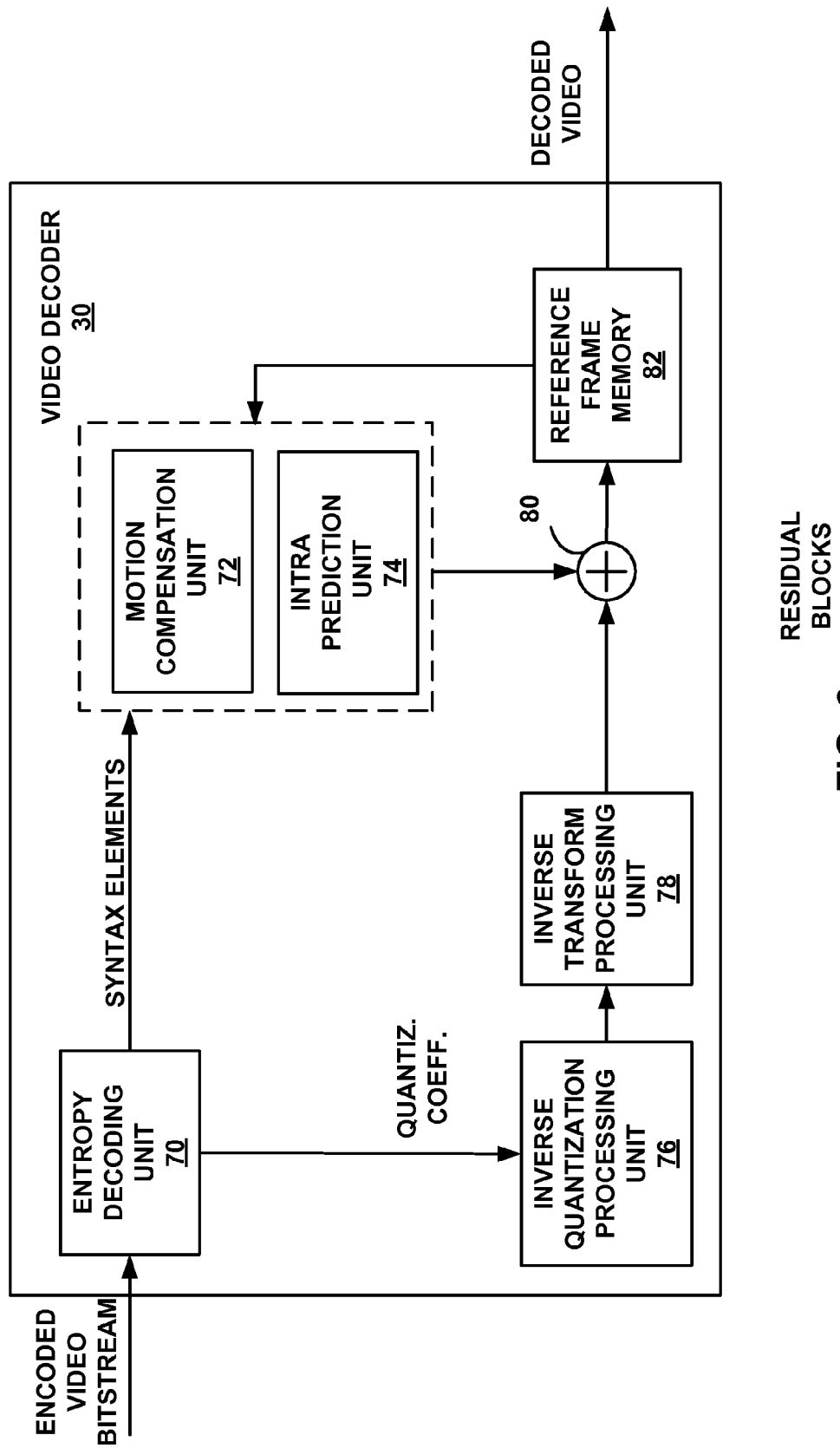
FIG. 6 is a block diagram illustrating an example of a video decoder that may implement techniques for decoding an encoded video sequence including predictive syntax elements, in accordance with this disclosure.

FIG. 6 is a block diagram illustrating an example of video decoder 30, which decodes an encoded video sequence. In one example, video decoder 30 may be configured to receive a entropy encoded bitstream that includes a set of flags and a respective syntax element corresponding to each flag, wherein each flag indicates whether a prediction mode of a respective prediction unit (PU) is based on an index into a list of most probable modes, CABAC decode the set of flags, bypass decode the respective syntax elements, and reconstruct video data based on the values of each flag and the respective syntax elements.

In the example of FIG. 6, video decoder 30 includes an entropy decoding unit 70, motion compensation unit 72, intra prediction unit 74, inverse quantization processing unit 76, inverse transform processing unit 78, reference frame memory 82, and summer 80. Video decoder 30 may, in some examples, perform a decoding pass generally reciprocal to the encoding pass described with respect to video encoder 20 (FIG. 4).

Entropy decoding unit 70 receives an entropy encoded bitstream and decodes syntax elements from the bitstream according to a reciprocal process to the entropy encoding process used to encode the syntax elements. In one example, the entropy encoding process used to encode the syntax elements may be any of the entropy encoding process described above.

Figure 7:
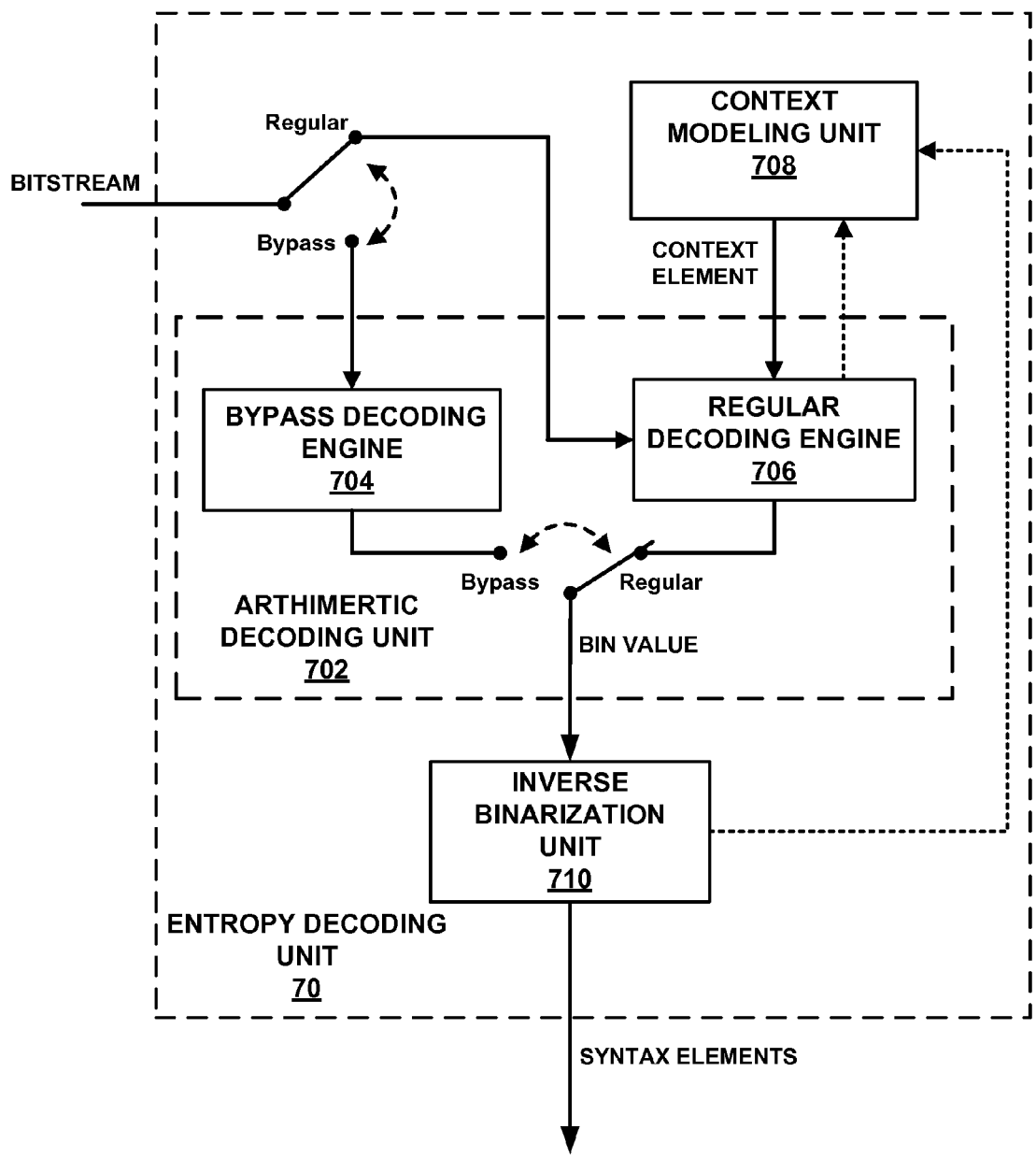
FIG. 7 is a block diagram illustrating an example of an entropy decoder that may implement techniques for entropy decoding predictive syntax elements, in accordance with this disclosure.

FIG. 7 is a block diagram that illustrates an example entropy decoding unit 70 that may implement the techniques described in this disclosure. Entropy decoding unit 70 receives an entropy encoded bitstream and decodes syntax elements from the bitstream. Syntax elements may include the intra-prediction syntax elements prev_intra_luma_pred_flag, mpm_idx, rem_intra_luma_pred_mode, intra_chroma_pred_mode, and chroma_pred_from_luma_enable_flag, described above. The order in which syntax elements are decoded by entropy decoding unit 70 may be defined according to a coding structure, such as the example coding structures described above with respect to Tables 3 through 10. The example entropy decoding unit 70 in FIG. 7 includes an arithmetic decoding unit 702, which may include a bypass decoding engine 704 and a regular decoding engine 706. The example entropy decoding unit 70 also includes context modeling unit 708 and inverse binarization unit 710. The example entropy decoding unit 70 may perform the reciprocal functions of the example entropy encoding unit 56 described with respect to FIG. 4. In this manner, entropy decoding unit 70 may perform entropy decoding based on the techniques described herein.

Arithmetic decoding unit 702 receives an encoded bit stream. As shown in FIG. 7, arithmetic decoding unit 702 may process encoded bin values according to a bypass path or the regular coding path. An indication whether an encoded bin value should be processed according to a bypass path or a regular pass may be signaled in the bitstream with higher level syntax. Consistent with the CABAC process described above, in the case where arithmetic decoding unit 702 receives bin values from a bypass path, bypass decoding engine 704 may perform arithmetic encoding on bin values without utilizing a context assigned to a bin value. In one example, bypass decoding engine 704 may assume equal probabilities for possible values of a bin.

In the case where arithmetic decoding unit 702 receives bin values through the regular path, context modeling unit 708 may provide a context variable, such that regular decoding engine 706 may perform arithmetic encoding based on the context assignments provided by context modeling unit 708. The context assignments may be defined according to a video coding standard, such as HEVC. The context models may be stored in memory. Context modeling unit 708 may include a series of indexed tables and/or utilize mapping functions to determine a context and a context variable portion of an encoded bitstream. After decoding a bin value, regular coding engine 706, may update a context based on the decoded bin values. Further, inverse binarization unit 710 may perform an inverse binarization on a bin value and use a bin matching function to determine if a bin value is valid. The inverse binarization unit 710 may also update the context modeling unit based on the matching determination. Thus, the inverse binarization unit 710 outputs syntax elements according to a context adaptive decoding technique.

The order in which the entropy decoding unit 70 receives syntax elements within a set of syntax elements may determine the total number of cycles that entropy decoding unit 70 requires to decode the set of syntax elements. In one example, the regular decoding engine 706 may require more than two cycles to decode a single bin. Further, in one example, the regular CABAC decoding engine 706 may require n+M cycles to decode n bins, where M is the overhead to start the pipeline. M is usually greater than 0. At the start of the CABAC decoding process (e.g., a switch from bypass mode to regular) pipeline overhead M is introduced. In one example, bypass decoding engine 704 may require one cycle to code an n-bit syntax element. Thus, the total number of cycles arithmetic decoding unit 510 requires to decode a set of bypass bins and CABAC bins may be based on the number of times pipeline overhead M is introduced. As such, the order in which intra-prediction syntax elements are arranged in a coding structure may determine the number of cycles video decoder 30 requires to decode video data. Further, it should be noted that although the example entropy decoding unit 70 illustrated in FIG. 7 is described as switching from a by-pass decoding operation to a regular decoding operation, in some cases these operations may be performed in parallel. However, in this case, the order in which entropy decoding unit 70 receives bypass and CABAC coded syntax elements may still determine the total number of cycles required to entropy decode the syntax elements.

Referring again to FIG. 6, motion compensation unit 72 may generate prediction data based on motion vectors received from entropy decoding unit 70. Motion compensation unit 72 may use motion vectors received in the bitstream to identify a prediction block in reference frames in reference frame memory 82. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (and reference frame lists) for each inter-encoded macroblock or partition, and other information to decode the encoded video sequence.

Intra prediction unit 74 may use intra prediction modes received in the bitstream to form a prediction block from spatially adjacent blocks. Intra prediction modes may include the intra prediction modes described above. Intra prediction unit 74 may determine an intra prediction mode to use according to the syntax elements prev_intra_luma_pred_flag, mpm_idx, rem_intra_luma_pred_mode, intra_chroma_pred_mode, and chroma_pred_from_luma_enable_flag, as described above.

Inverse quantization unit 76 inverse quantizes, i.e., dequantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by a video encoder for each macroblock to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. Summer 80 sums the residual blocks with the corresponding prediction blocks generated by motion compensation unit 72 or intra-prediction unit 74 to form decoded blocks. In this manner, video decoder 30 reconstructs video blocks from an encoded bitstream.

Figure 8:
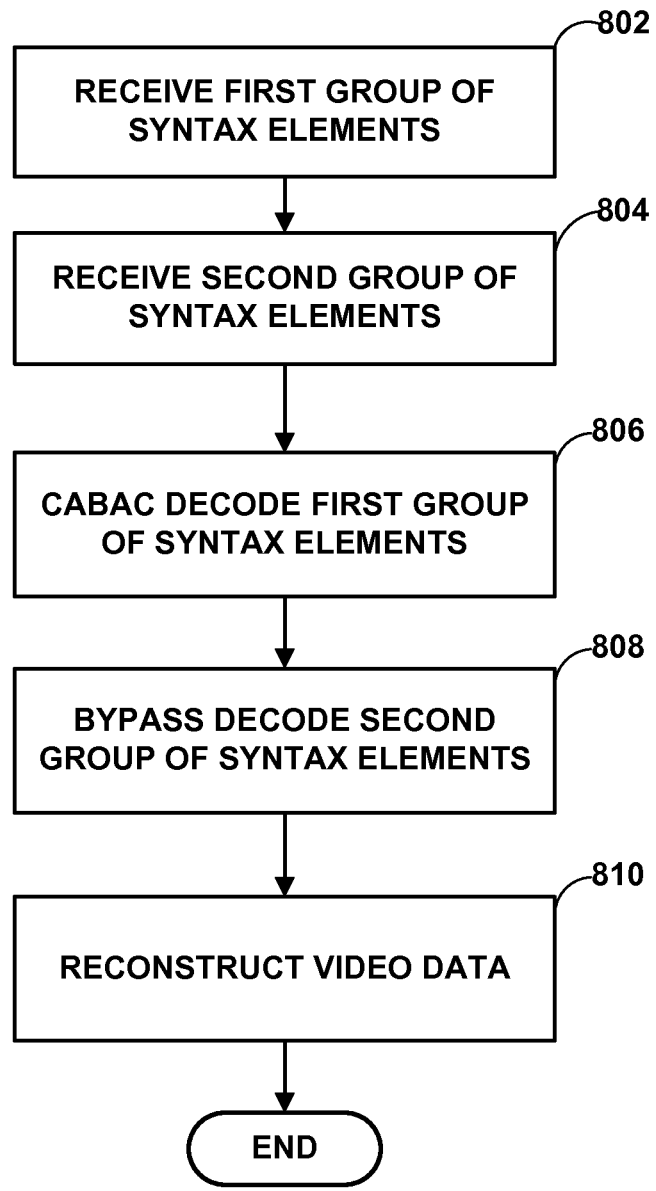
FIG. 8 is a flowchart illustrating decoding predictive syntax elements according to the techniques of this disclosure.

FIG. 8 is a flowchart illustrating an example of decoding video data according to the techniques of this disclosure. Although the process in FIG. 8 is described below as generally being performed by video decoder 30, the process may be performed by any combination of video decoder 30, intra prediction unit 74, and/or entropy decoding unit 70.

As illustrated in FIG. 8, video decoder 30 receives a first group of syntax elements (802). Video decoder 30 receives a second group of syntax elements where the syntax elements of the second group of syntax elements correspond to respective syntax elements of the first group of syntax elements (804). In other words, video decoder 30 receives the entropy encoded bitstream that includes the first group of syntax elements and the second group of syntax elements for prediction units (PUs) of a coding unit (CU).

In one example, a syntax element within the first group indicates whether a prediction mode of a respective prediction unit (PU) is based on an index into a list of most probable modes. In one example, the first group includes four of syntax element prev_intra_luma_pred_flag corresponding to four, respective PUs in an INTRA_N×N PU structure. In one example, a syntax element in the second group of syntax elements may be either of syntax elements mpm_idx or rem_intra_luma_pred_mode, as described above. In one example, the first group of syntax elements and the second group of syntax elements may be arranged according to the coding structure described with respect to Table 8. In this manner, the order in which video decoder 30 receives and performs operations on the set of flags and respective syntax elements may be defined according to the coding structure.

Video decoder 30 CABAC decodes the first group of syntax elements (806). In one example, video decoder 30 CABAC decodes the first group of syntax elements using a regular context adaptive binary arithmetic coding (CABAC) engine, such as regular decoding engine 706 described with respect to FIG. 7. Video decoder 30 bypass decodes the second group of syntax elements (808). In one example, video decoder 30 may entropy decode the second group of syntax elements subsequent to entropy decoding the first group of syntax elements. Further, in one example, video decoder 30 may entropy decode the second group of syntax elements using a bypass decoding engine, such as bypass decoding engine 704 described with respect to FIG. 7. Video decoder 30 decodes and reconstructs video data based on the decoded first group of syntax elements and the decoded second group of syntax elements (810). In one example, video decoder 30 reconstructs video data by summing residual blocks of video data and corresponding prediction blocks of video data associated with the respective syntax elements. For instance, video decoder 30 intra-prediction decodes the PUs of the CU based on the first group of syntax elements and the decoded second group of syntax elements.

To reiterate, similar to the description above with respect to video encoder 20 and FIG. 5, examples of the first group of syntax elements include a plurality of flags (e.g., the prev_intra_luma_pred_flag syntax elements). A flag plurality of flags may be the syntax element of the first group of syntax elements that indicates whether the intra-prediction mode of luma samples of the respective PU is based on an index into the list of most probable modes.

In some examples, the second group of syntax elements includes a first syntax element that indicates the index into the list of most probable modes if the corresponding syntax element in the first group of syntax elements indicates that the intra-prediction mode of the luma samples of the respective PU is based on the index into the list of most probable modes. For example, if the prev_intra_luma_pred_flag syntax element for the respective PU indicates that the intra-prediction mode for the respective PU is based on an index into a list of most probable modes, then the corresponding mpm_idx syntax element for the respective PU indicates the index into the list of most probable modes. In this example, the mpm_idx syntax element is considered as the first syntax element in the second group of syntax elements.

In some examples, the second group of syntax elements includes a second syntax element that indicates the intra-prediction mode for the respective PU if the corresponding syntax element in the first group of syntax elements indicates that the intra-prediction mode of the luma samples of the respective PU is not based on the index into the list of most probable modes. For example, if the prev_intra_luma_pred_flag syntax element for the respective PU indicates that the intra-prediction mode for the respective PU is not based on an index into a list of most probable modes, then the corresponding rem_intra_luma_pred_mode syntax element for the respective PU indicates the intra-prediction mode. In this example, the rem_intra_luma_pred_mode syntax element is considered as the second syntax element in the second group of syntax elements.

As described above, the list of most probable modes that video decoder 30 constructs identifies one or more intra-prediction modes of one or more neighboring PUs. In some examples, video decoder 30 may receive all syntax elements of the first group of syntax elements for the PUs of the CU before receiving any syntax elements of the second group of syntax elements for the PUs of the CU. In some examples, video decoder 30 may CABAC decode all syntax elements of the first group of syntax elements prior to bypass decoding any syntax element of the second group of syntax elements.

In the above examples, when the prediction mode for a CU is INTRA_N×N, the CU includes four PUs, and each PU has one luma intra-prediction mode and only one chroma intra-prediction mode for the whole CU. However, there may be some potential drawbacks with such a design. As one example, there may be inefficient prediction performance because four PUs with different texture pattern are forced to use one identical chroma prediction mode. As another example, there may be inconsistent mode signaling between luma and chroma components.

The following describes some examples to address the drawbacks associated with a requirement that there be only one chroma intra-prediction mode for the whole CU. The following techniques may be applied in conjunction with the techniques described above for when there is only one chroma intra-prediction mode for the whole CU or separately with the techniques described above for when there is only one chroma intra-prediction mode of the whole CU.

To address the potential issue of inefficient prediction performance introduced above, techniques of this disclosure include signaling one chroma intra prediction mode for each PU as done for luma intra prediction mode, i.e. four chroma_intra_prediction_modes are signaled for a CU with prediction mode as INTRA_N×N in the context of current HEVC standard. With this design, one "luma_intra_prediction_mode" syntax element and one "chroma_intra_prediction_mode" syntax element are signaled consequently to represent intra prediction mode for a PU.

In some examples, this intra mode signaling scheme may be applied unless the current CU size is equal to 8×8 and a smallest transform unit size is 4×4. More generically, this exception exists when the current CU size is twice the smallest transform_unit_size in each dimension, which means a chroma component of the current CU is equal to a smallest transform unit size and cannot be split into four PUs further (assuming source format is YUV420). In such a case, only one chroma_intra_prediction_mode is signaled for the current CU.

According to these examples, the coding structure for intra modes can be implemented as shown in the examples of Table 11 and Table 12.

TABLE 11

Intra-mode coding structure for intra_2Nx2N

```
prev_intra_luma_pred_flag[ x0 ][ y0 ]                CABAC
if( prev_intra_luma_pred_flag[ x0 ][ y0 ] )
  mpm_idx[ x0 ][ y0 ]                                bypass
Else
  rem_intra_luma_pred_mode[ x0 ][ y0 ]               bypass
  chroma_mode_cabac_bins [ x0 ][ y0 ]                CABAC
  chroma_mode_bypass_bins[ x0 ][ y0 ]                bypass
```

TABLE 12

Intra-mode coding structure for intra_NxN

```
prev_intra_luma_pred_flag[ x0 ][ y0 ] (CABAC-CODED)
if( prev_intra_luma_pred_flag[ x0 ][ y0 ] )
  mpm_idx[ x0 ][ y0 ] (BYPASS-CODED)
Else
  rem_intra_luma_pred_mode[ x0 ][ y0 ] (BYPASS-CODED)
  chroma_mode_cabac_bins [ x0 ][ y0 ] (CABAC-CODED)
  chroma_mode_bypass_bins[ x0 ][ y0 ] (BYPASS-CODED)
prev_intra_luma_pred_flag[ x1 ][ y0 ] (CABAC-CODED)
if( prev_intra_luma_pred_flag[ x1 ][ y0 ] )
  mpm_idx[ x1 ][ y0 ] (BYPASS-CODED)
Else
  rem_intra_luma_pred_mode[ x1 ][ y0 ] (BYPASS-CODED)
  if( CU_size != 2*smallest_TU_size ) {
    chroma_mode_cabac_bins [ x1 ][ y0 ] (CABAC-CODED)
    chroma_mode_bypass_bins[ x1 ][ y0 ] (BYPASS-CODED)
  }
prev_intra_luma_pred_flag[ x0 ][ y1 ] (CABAC-CODED)
if( prev_intra_luma_pred_flag[ x0 ][ y1 ] )
  mpm_idx[ x0 ][ y1 ] (BYPASS-CODED)
Else
  rem_intra_luma_pred_mode[ x0 ][ y1 ] (BYPASS-CODED)
  if( CU_size != 2*smallest_TU_size ) {
    chroma_mode_cabac_bins [ x0 ][ y1 ] (CABAC-CODED)
    chroma_mode_bypass_bins[ x0 ][ y1 ] (BYPASS-CODED)
  }
prev_intra_luma_pred_flag[ x1 ][ y1 ] (CABAC-CODED)
if( prev_intra_luma_pred_flag[ x1 ][ y1 ] )
  mpm_idx[ x1 ][ y1 ] (BYPASS-CODED)
Else
  rem_intra_luma_pred_mode[ x1 ][ y1 ] (BYPASS-CODED)
  if( CU_size != 2*smallest_TU_size ) {
    chroma_mode_cabac_bins [ x1 ][ y1 ] (CABAC-CODED)
    chroma_mode_bypass_bins[ x1 ][ y1 ] (BYPASS-CODED)
  }
```

The following describes examples of where the intra-prediction mode for the luma samples of each PU and the chroma samples of each PU of a CU are defined, rather than only one intra-prediction mode for the chroma samples for the whole CU. Tables 13 and 14 define a manner for arranging intra-prediction syntax for the intra-mode coding structure for intra_2N×2N and intra_N×N, respectively, where all CABAC-coded bins of luma intra-prediction mode and chroma intra-prediction mode are coded together, and then all bypass-coded bins of luma intra-prediction mode and chroma intra-prediction mode are coded together. Tables 15 and 16 define a manner for arranging intra-prediction syntax for the intra-mode coding structure for intra_2N×2N and intra_N×N, respectively, where all CABAC-coded bins of intra-prediction mode for all PUs in CU are coded together, and then all bypass-coded bins of intra-prediction mode are coded together. Tables 17 and 18 define a manner for arranging intra-prediction syntax for the intra-mode coding structure for intra_2N×2N and intra_N×N, respectively, where all CABAC-coded bins of both luma and chroma intra-prediction mode for all PUs in a CU are coded, and then all bypass-coded bins of luma and chroma intra-prediction mode are coded together.

TABLE 13

Intra-mode coding structure for intra_2Nx2N

```
prev_intra_luma_pred_flag[ x0 ][ y0 ] (CABAC-CODED)
  chroma_mode_cabac_bins [ x0 ][ y0 ] (CABAC-CODED)
if( prev_intra_luma_pred_flag[ x0 ][ y0 ] )
  mpm_idx[ x0 ][ y0 ] (BYPASS-CODED)
Else
  rem_intra_luma_pred_mode[ x0 ][ y0 ] (BYPASS-CODED)
  chroma_mode_bypass_bins[ x0 ][ y0 ] (BYPASS-CODED)
```

TABLE 14

Intra-mode coding structure for intra_2Nx2N

```
prev_intra_luma_pred_flag[ x0 ][ y0 ] (CABAC-CODED)
  chroma_mode_cabac_bins [ x0 ][ y0 ] (CABAC-CODED)
if( prev_intra_luma_pred_flag[ x0 ][ y0 ] )
  mpm_idx[ x0 ][ y0 ] (BYPASS-CODED)
Else
  rem_intra_luma_pred_mode[ x0 ][ y0 ] (BYPASS-CODED)
  chroma_mode_bypass_bins[ x0 ][ y0 ] (BYPASS-CODED)
prev_intra_luma_pred_flag[ x1 ][ y0 ] (CABAC-CODED)
if( CU_size != 2*smallest_TU_size )
  chroma_mode_cabac_bins [ x1 ][ y0 ] (CABAC-CODED)
if( prev_intra_luma_pred_flag[ x1 ][ y0 ] )
  mpm_idx[ x1 ][ y0 ] (BYPASS-CODED)
Else
  rem_intra_luma_pred_mode[ x1 ][ y0 ] (BYPASS-CODED)
if( CU_size != 2*smallest_TU_size )
  chroma_mode_bypass_bins[ x1 ][ y0 ] (BYPASS-CODED)
prev_intra_luma_pred_flag[ x0 ][ y1 ] (CABAC-CODED)
if( CU_size != 2*smallest_TU_size )
  chroma_mode_cabac_bins [ x0 ][ y1 ] (CABAC-CODED)
if( prev_intra_luma_pred_flag[ x0 ][ y1 ] )
  mpm_idx[ x0 ][ y1 ] (BYPASS-CODED)
Else
  rem_intra_luma_pred_mode[ x0 ][ y1 ] (BYPASS-CODED)
if( CU_size != 2*smallest_TU_size )
  chroma_mode_bypass_bins[ x0 ][ y1 ] (BYPASS-CODED)
prev_intra_luma_pred_flag[ x1 ][ y1 ] (CABAC-CODED)
if( CU_size != 2*smallest_TU_size )
  chroma_mode_cabac_bins [ x1 ][ y1 ] (CABAC-CODED)
if( prev_intra_luma_pred_flag[ x 1 ][ y1 ] )
  mpm_idx[ x1 ][ y1 ] (BYPASS-CODED)
Else
  rem_intra_luma_pred_mode[ x1 ][ y1 ] (BYPASS-CODED)
if( CU_size != 2*smallest_TU_size )
  chroma_mode_bypass_bins[ x1 ][ y1 ] (BYPASS-CODED)
```

TABLE 15

Intra-mode coding structure for intra_NxN prev_intra_luma_pred_flag[ x0 ][ y0 ] (CABAC-CODED)
if( prev_intra_luma_pred_flag[ x0 ][ y0 ] )
  mpm_idx[ x0 ][ y0 ] (BYPASS-CODED)
Else
  rem_intra_luma_pred_mode[ x0 ][ y0 ] (BYPASS-CODED)
  chroma_mode_cabac_bins [ x0 ][ y0 ] (CABAC-CODED)
  chroma_mode_bypass_bins[ x0 ][ y0 ] (BYPASS-CODED)

TABLE 16

Intra-mode coding structure for intra_2Nx2N prev_intra_luma_pred_flag[ x0 ][ y0 ] (CABAC-CODED)
prev_intra_luma_pred_flag[ x1 ][ y0 ] (CABAC-CODED)
prev_intra_luma_pred_flag[ x0 ][ y1 ] (CABAC-CODED)
prev_intra_luma_pred_flag[ x1 ][ y1 ] (CABAC-CODED)
if( prev_intra_luma_pred_flag[ x0 ][ y0 ] )
  mpm_idx[ x0 ][ y0 ] (BYPASS-CODED)
Else
  rem_intra_luma_pred_mode[ x0 ][ y0 ] (BYPASS-CODED)
if( prev_intra_luma_pred_flag[ x1 ][ y0 ] )
  mpm_idx[ x1 ][ y0 ] (BYPASS-CODED)
Else
  rem_intra_luma_pred_mode[ x1 ][ y0 ] (BYPASS-CODED)
if( prev_intra_luma_pred_flag[ x0 ][ y1 ] )
  mpm_idx[ x0 ][ y1 ] (BYPASS-CODED)
Else
  rem_intra_luma_pred_mode[ x0 ][ y1 ] (BYPASS-CODED)
if( prev_intra_luma_pred_flag[ x1 ][ y1 ] )
  mpm_idx[ x1 ][ y1 ] (BYPASS-CODED)
Else
  rem_intra_luma_pred_mode[ x1 ][ y1 ] (BYPASS-CODED)
  chroma_mode_cabac_bins [ x0 ][ y0 ] (CABAC-CODED)
if( CU_size != 2*smallest_TU_size ) {
  chroma_mode_cabac_bins [ x1 ][ y0 ] (CABAC-CODED)
  chroma_mode_cabac_bins [ x0 ][ y1 ] (CABAC-CODED)
  chroma_mode_cabac_bins [ x1 ][ y1 ] (CABAC-CODED)
}
chroma_mode_bypass_bins[ x0 ][ y0 ] (BYPASS-CODED)
if( CU_size != 2*smallest_TU_size ) {
  chroma_mode_bypass_bins [ x1 ][ y0 ] (BYPASS-CODED)
  chroma_mode_bypass_bins [ x0 ][ y1 ] (BYPASS-CODED)
  chroma_mode_bypass_bins [ x1 ][ y1 ] (BYPASS-CODED)
}

TABLE 17

Intra-mode coding structure for intra_NxN prev_intra_luma_pred_flag[ x0 ][ y0 ] (CABAC-CODED)
chroma_mode_cabac_bins [ x0 ][ y0 ] (CABAC-CODED)
if( prev_intra_luma_pred_flag[ x0 ][ y0 ] )
  mpm_idx[ x0 ][ y0 ] (BYPASS-CODED)
Else
  rem_intra_luma_pred_mode[ x0 ][ y0 ] (BYPASS-CODED)
  chroma_mode_bypass_bins[ x0 ][ y0 ] (BYPASS-CODED)

TABLE 18

Intra-mode coding structure for intra_2Nx2N prev_intra_luma_pred_flag[ x0 ][ y0 ] (CABAC-CODED)
prev_intra_luma_pred_flag[ x1 ][ y0 ] (CABAC-CODED)
prev_intra_luma_pred_flag[ x0 ][ y1 ] (CABAC-CODED)
prev_intra_luma_pred_flag[ x1 ][ y1 ] (CABAC-CODED)
chroma_mode_cabac_bins [ x0 ][ y0 ] (CABAC-CODED)
if( CU_size != 2*smallest_TU_size ) {
  chroma_mode_cabac_bins [ x1 ][ y0 ] (CABAC-CODED)
  chroma_mode_cabac_bins [ x0 ][ y1 ] (CABAC-CODED)
  chroma_mode_cabac_bins [ x1 ][ y1 ] (CABAC-CODED)
}

TABLE 18-continued

Intra-mode coding structure for intra_2Nx2N if( prev_intra_luma_pred_flag[ x0 ][ y0 ] )
  mpm_idx[ x0 ][ y0 ] (BYPASS-CODED)
Else
  rem_intra_luma_pred_mode[ x0 ][ y0 ] (BYPASS-CODED)
if( prev_intra_luma_pred_flag[ x1 ][ y0 ] )
  mpm_idx[ x1 ][ y0 ] (BYPASS-CODED)
Else
  rem_intra_luma_pred_mode[ x1 ][ y0 ] (BYPASS-CODED)
if( prev_intra_luma_pred_flag[ x0 ][ y1 ] )
  mpm_idx[ x0 ][ y1 ] (BYPASS-CODED)
Else
  rem_intra_luma_pred_mode[ x0 ][ y1 ] (BYPASS-CODED)
if( prev_intra_luma_pred_flag[ x1 ][ y1 ] )
  mpm_idx[ x1 ][ y1 ] (BYPASS-CODED)
Else
  rem_intra_luma_pred_mode[ x1 ][ y1 ] (BYPASS-CODED)
chroma_mode_bypass_bins[ x0 ][ y0 ] (BYPASS-CODED)
if( CU_size != 2*smallest_TU_size ) {
  chroma_mode_bypass_bins [ x1 ][ y0 ] (BYPASS-CODED)
  chroma_mode_bypass_bins [ x0 ][ y1 ] (BYPASS-CODED)
  chroma_mode_bypass_bins [ x1 ][ y1 ] (BYPASS-CODED)
}

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A method of decoding video data, the method comprising:
  receiving an entropy encoded bitstream that includes a first group of syntax elements comprising a plurality of flags and a second group of syntax elements for prediction units (PUs) of a coding unit (CU), wherein syntax elements of the second group of syntax elements correspond to respective syntax elements of the first group of syntax elements, and wherein a flag of the plurality of flags of the first group of syntax elements indicates whether an intra-prediction mode of luma samples of a respective PU in the CU is based on an index into a list of most probable modes and which syntax element is to be received in the second group of syntax elements for the respective PU in the CU, wherein receiving comprises receiving all syntax elements of the first group of syntax elements for the PUs of the CU before receiving any syntax elements of the second group of syntax elements for the PUs of the CU;
  context adaptive binary arithmetic coding (CABAC) decoding all syntax elements of the first group of syntax elements prior to bypass decoding any syntax elements of the second group of syntax elements;
  subsequent to CABAC decoding all syntax elements of the first group of syntax elements, bypass decoding the second group of syntax elements, wherein the second group of syntax elements comprises one of:
  a first syntax element that indicates the index into the list of most probable modes if the flag in the first group of syntax elements indicates that the intra-prediction mode of the luma samples of the respective PU is based on the index into the list of most probable modes; or
  a second syntax element that indicates the intra-prediction mode of the luma samples of the respective PU if the flag in the first group of syntax elements indicates that the intra-prediction mode of the luma samples of the respective PU is not based on the index into the list of most probable modes; and
  reconstructing the video data based on the decoded first group of syntax elements and the decoded second group of syntax elements.

2. The method of claim 1, further comprising:
  CABAC decoding a first set of bins used to indicate a chroma intra prediction mode separately from the CABAC decoding of the first group of syntax elements; and
  bypass decoding a second set of bins used to indicate the chroma intra prediction mode separately from the bypass decoding of the second group of syntax elements.

3. The method of claim 1, wherein the list of most probable modes identifies one or more intra-prediction modes of one or more neighboring PUs.

4. The method of claim 1, wherein the first group of syntax elements includes four flags, and wherein each of the four flags is associated with a respective PU of an INTRA N×N PU structure of the CU.

5. The method of claim 1, wherein reconstructing comprises:
  intra-prediction decoding the PUs of the CU based on the first group of syntax elements and the second group of syntax elements.

6. An apparatus for decoding video data, the apparatus comprising:
  a memory configured to store the video data; and
  one or more processor comprising a video decoder, the video decoder configured to:
  receive an entropy encoded bitstream that includes a first group of syntax elements comprising a plurality of flags and a second group of syntax elements for prediction units (PUs) of a coding unit (CU), wherein syntax elements of the second group of syntax elements correspond to respective syntax elements of the first group of syntax elements, and wherein a flag of the plurality of flags of the first group of syntax elements indicates whether an intra-prediction mode luma samples of a respective PU in the CU is based on an index into a list of most probable modes and which syntax element is to be received in the second group of syntax elements for the respective PU in the CU, wherein the video decoder is configured to receive all syntax elements of the first group of syntax elements for the PUs of the CU before receiving any syntax elements of the second group of syntax elements for the PUs of the CU;
  context adaptive binary arithmetic coding (CABAC) decode all syntax elements of the first group of syntax elements prior to bypass decoding any syntax elements of the second group of syntax elements;
  subsequent to CABAC decoding all syntax elements of the first group of syntax elements, bypass decode the second group of syntax elements, wherein the second group of syntax elements comprises one of:
  a first syntax element that indicates the index into the list of most probable modes if the flag in the first group of syntax elements indicates that the intra-prediction mode of the luma samples of the respective PU is based on the index into the list of most probable modes; or
  a second syntax element that indicates the intra-prediction mode of the luma samples of the respective PU if the flag in the first group of syntax elements indicates that the intra-prediction mode of the luma samples of the respective PU is not based on the index into the list of most probable modes; and reconstructing the video data based on the decoded first group of syntax elements and the decoded second group of syntax elements that are stored in the memory.

7. The apparatus of claim 6, wherein the video decoder is configured to:
CABAC decode a first set of bins used to indicate a chroma intra prediction mode separately from the CABAC decoding of the first group of syntax elements; and
bypass decode a second set of bins used to indicate the chroma intra prediction mode separately from the bypass decoding of the second group of syntax elements.

8. The apparatus of claim 6, wherein the list of most probable modes identifies one or more intra-prediction modes of one or more neighboring PUs.

9. The apparatus of claim 6, wherein the first group of syntax elements includes four flags, and wherein each of the four flags is associated with a respective PU of an INTRA_N×N PU structure of the CU.

10. The apparatus of claim 6, wherein, to reconstruct, the video decoder is configured to:
intra-prediction decode the PUs of the CU based on the first group of syntax elements and the second group of syntax elements.

11. The apparatus of claim 6, wherein the apparatus comprises at least one of:
an integrated circuit;
a microprocessor; or
a wireless communication device that includes the video decoder and a display to display the reconstructed video data.

12. A non-transitory computer-readable storage medium having instructions stored thereon that, when executed, cause one or more processors of a device for decoding video data to:
receive an entropy encoded bitstream that includes a first group of syntax elements comprising a plurality of flags and a second group of syntax elements for prediction units (PUs) of a coding unit (CU), wherein syntax elements of the second group of syntax elements correspond to respective syntax elements of the first group of syntax elements, and wherein a flag of the plurality of flags of the first group of syntax elements indicates whether an intra-prediction mode of luma samples of a respective PU in the CU is based on an index into a list of most probable modes and which syntax element is to be received in the second group of syntax elements for the respective PU in the CU, wherein the instructions that cause the one or more processors to receive comprise instructions that cause the one or more processors to receive all syntax elements of the first group of syntax elements for the PUs of the CU before receiving any syntax elements of the second group of syntax elements for the PUs of the CU;
context adaptive binary arithmetic coding (CABAC) decode all syntax elements of the first group of syntax elements prior to bypass decoding any syntax elements of the second group of syntax elements;
subsequent to CABAC decoding all syntax elements the first group of syntax elements, bypass decode the second group of syntax elements, wherein the second group of syntax elements comprises one of:
a first syntax element that indicates the index into the list of most probable modes if the flag in the first group of syntax elements indicates that the intra-prediction mode of the luma samples of the respective PU is based on the index into the list of most probable modes; or
a second syntax element that indicates the intra-prediction mode of the luma samples of the respective PU if the flag in the first group of syntax elements indicates that the intra-prediction mode of the luma samples of the respective PU is not based on the index into the list of most probable modes; and
reconstructing the video data based on the decoded first group of syntax elements and the decoded second group of syntax elements.

13. The non-transitory computer-readable storage medium of claim 12, further comprising instructions that cause the one or more processors to:
CABAC decode a first set of bins used to indicate a chroma intra prediction mode separately from the CABAC decoding of the first group of syntax elements; and
bypass decode a second set of bins used to indicate the chroma intra prediction mode separately from the bypass decoding of the second group of syntax elements.

14. The non-transitory computer-readable storage medium of claim 12, wherein the list of most probable modes identifies one or more intra-prediction modes of one or more neighboring PUs.

15. The non-transitory computer-readable storage medium of claim 12, wherein the first group of syntax elements includes four flags, and wherein each of the four flags is associated with a respective PU of an INTRA_N×N PU structure of the CU.

16. The non-transitory computer-readable storage medium of claim 12, wherein the instructions that cause the one or more processors to reconstruct comprise instructions that cause the one or more processors to:
intra-prediction decode the PUs of the CU based on the first group of syntax elements and the second group of syntax elements.

17. An apparatus for decoding video data, the apparatus comprising:
means for receiving an entropy encoded bitstream that includes a first group of syntax elements comprising a plurality of flags and a second group of syntax elements for prediction units (PUs) of a coding unit (CU), wherein syntax elements of the second group of syntax elements correspond to respective syntax elements of the first group of syntax elements, and wherein a flag of the plurality of flags of the first group of syntax elements indicates whether an intra-prediction mode of luma samples of a respective PU in the CU is based on an index into a list of most probable modes and which syntax element is to be received in the second group of syntax elements for the respective PU in the CU, wherein the means for receiving comprises means for receiving all syntax elements of the first group of syntax elements for the PUs of the CU before receiving any syntax elements of the second group of syntax elements for the PUs of the CU;
means for context adaptive binary arithmetic coding (CABAC) decoding all syntax elements of the first group of syntax elements prior to bypass decoding any syntax elements of the second group of syntax elements;
means for bypass decoding the second group of syntax elements, subsequent to CABAC decoding all syntax elements of the first group of syntax elements, wherein the second group of syntax elements comprises one of:
  a first syntax element that indicates the index into the list of most probable modes if the flag in the first group of syntax elements indicates that the intra-prediction mode of the luma samples of the respective PU is based on the index into the list of most probable modes; or
  a second syntax element that indicates the intra-prediction mode of the luma samples of the respective PU if the flag in the first group of syntax elements indicates that the intra-prediction mode of the luma samples of the respective PU is not based on the index into the list of most probable modes; and
means for reconstructing the video data based on the decoded first group of syntax elements and the decoded second group of syntax elements.

18. The apparatus of claim 17, further comprising:
means for CABAC decoding a first set of bins used to indicate a chroma intra prediction mode separately from the CABAC decoding of the first group of syntax elements; and
means for bypass decoding a second set of bins used to indicate the chroma intra prediction mode separately from the bypass decoding of the second group of syntax elements.

19. A method of encoding video data, the method comprising:
generating a first group of syntax elements comprising a plurality of flags, wherein a flag of the plurality of flags of the first group of syntax elements indicates whether an intra-prediction mode of luma samples of a respective prediction unit (PU) in a coding unit (CU) is based on an index into a list of most probable modes;
generating a second group of syntax elements, wherein syntax elements of the second group of syntax elements correspond to respective syntax elements of the first group of syntax elements, wherein the flag of the plurality of flags of the first group of syntax elements indicates which syntax element is to be outputted in the second group of syntax elements for the respective PU in the CU, and wherein the second group of syntax elements comprises one of:
  a first syntax element that indicates the index into the list of most probable modes if the flag in the first group of syntax elements indicates that the intra-prediction mode of the luma samples of the respective PU is based on the index into the list of most probable modes; or
  a second syntax element that indicates the intra-prediction mode of the luma samples of the respective PU if the flag in the first group of syntax elements indicates that the intra-prediction mode of the luma samples of the respective PU is not based on the index into the list of most probable modes;
context adaptive binary arithmetic coding (CABAC) encoding all syntax elements of the first group of syntax elements prior to bypass encoding any syntax elements of the second group of syntax elements;
subsequent to CABAC encoding all syntax elements of the first group of syntax elements, bypass encoding the second group of syntax elements; and
outputting the video data that includes the encoded first group of syntax elements and the encoded second group of syntax elements, wherein outputting comprises outputting all syntax elements of the first group of syntax elements for the PUs of the CU before outputting any syntax elements of the second group of syntax elements for the PUs of the CU.

20. The method of claim 19, further comprising:
CABAC encoding a first set of bins used to indicate a chroma intra prediction mode separately from the CABAC encoding of the first group of syntax elements; and
bypass encoding a second set of bins used to indicate the chroma intra prediction mode separately from the bypass encoding of the second group of syntax elements.

21. The method of claim 19, wherein the list of most probable modes identifies one or more intra-prediction modes of one or more neighboring PUs.

22. The method of claim 19, wherein the first group of syntax elements includes four flags, and wherein each of the four flags is associated with a respective PU of an INTRA N×N PU structure of the CU.

23. The method of claim 19, further comprising:
intra-prediction encoding the PUs of the CU based on the first group of syntax elements and the second group of syntax elements.

24. An apparatus for encoding video data, the apparatus comprising:
a memory configured to store the video data;
one or more processor comprising a video encoder, the video encoder configured to:
generate a first group of syntax elements comprising a plurality of flags, wherein a flag of the plurality of flags of the first group of syntax elements indicates whether an intra-prediction mode of luma samples of a respective prediction unit (PU) in a coding unit (CU) is based on an index into a list of most probable modes;
generate a second group of syntax elements, wherein syntax elements of the second group of syntax elements correspond to respective syntax elements of the first group of syntax elements, wherein the flag of the plurality of flags of the first group of syntax elements indicates which syntax element is to be outputted in the second group of syntax elements for the respective PU in the CU, and wherein the second group of syntax elements comprises one of:
  a first syntax element that indicates the index into the list of most probable modes if the flag in the first group of syntax elements indicates that the intra-prediction mode of the luma samples of the respective PU is based on the index into the list of most probable modes; or
  a second syntax element that indicates the intra-prediction mode of the luma samples of the respective PU if the flag in the first group of syntax elements indicates that the intra-prediction mode of the luma samples of the respective PU is not based on the index into the list of most probable modes;
context adaptive binary arithmetic coding (CABAC) encode all syntax elements of the first group of syntax elements prior to bypass encoding any syntax elements of the second group of syntax elements;
subsequent to CABAC encoding all syntax elements of the first group of syntax elements, bypass encode the second group of syntax elements; and
output the video data that includes the encoded first group of syntax elements and the encoded second group of syntax elements that are stored in the memory, wherein the video encoder is configured to output all syntax elements of the first group of syntax elements for the PUs of the CU before outputting any syntax elements of the second group of syntax elements for the PUs of the CU.

25. The apparatus of claim 24, wherein the video encoder is configured to:
   CABAC encode a first set of bins used to indicate a chroma intra prediction mode separately from the CABAC encoding of the first group of syntax elements; and
   bypass encode a second set of bins used to indicate the chroma intra prediction mode separately from the bypass encoding of the second group of syntax elements.

26. The apparatus of claim 24, wherein the list of most probable modes identifies one or more intra-prediction modes of one or more neighboring PUs.

27. The apparatus of claim 24, wherein the first group of syntax elements includes four flags, and wherein each of the four flags is associated with a respective PU of an INTRA N×N PU structure of the CU.

28. The apparatus of claim 24, wherein the video encoder is configured to:
   intra-prediction encode the PUs of the CU based on the first group of syntax elements and the second group of syntax elements.

29. The apparatus of claim of claim 24, further comprising a camera configured to capture the video data.

30. A non-transitory computer-readable storage medium having instructions stored thereon that, when executed, cause one or more processors of a device for encoding video data to:
   generate a first group of syntax elements comprising a plurality of flags, wherein a flag of the plurality of flags of the first group of syntax elements indicates whether an intra-prediction mode of luma samples a respective prediction unit (PU) in a coding unit (CU) is based on an index into a list of most probable modes;
   generate a second group of syntax elements, wherein syntax elements of the second group of syntax elements correspond to respective syntax elements of the first group of syntax elements, wherein the flag of the plurality of flags of the first group of syntax elements indicates which syntax element is to be outputted in the second group of syntax elements for the respective PU in the CU, wherein the second group of syntax elements comprises one of:
      a first syntax element that indicates the index into the list of most probable modes if the flag in the first group of syntax elements indicates that the intra-prediction mode of the luma samples of the respective PU is based on the index into the list of most probable modes; or
      a second syntax element that indicates the intra-prediction mode of the luma samples of the respective PU if the flag in the first group of syntax elements indicates that the intra-prediction mode of the luma samples of the respective PU is not based on the index into the list of most probable modes;
   context adaptive binary arithmetic coding (CABAC) encode all syntax elements of the first group of syntax elements prior to bypass encoding any syntax elements of the second group of syntax elements;
   subsequent to CABAC encoding all syntax elements of the first group of syntax elements, bypass encode the second group of syntax elements; and
   output the video data that includes the encoded first group of syntax elements and the encoded second group of syntax elements, wherein the instructions that cause the one or more processors to output comprise instructions that cause the one or more processors to output all syntax elements of the first group of syntax elements for the PUs of the CU before outputting any syntax elements of the second group of syntax elements for the PUs of the CU.

31. The non-transitory computer-readable storage medium of claim 30, further comprising instructions that cause the one or more processors to:
   CABAC encode a first set of bins used to indicate a chroma intra prediction mode separately from the CABAC encoding of the first group of syntax elements; and
   bypass encode a second set of bins used to indicate the chroma intra prediction mode separately from the bypass encoding of the second group of syntax elements.

32. The non-transitory computer-readable storage medium of claim 30, wherein the list of most probable modes identifies one or more intra-prediction modes of one or more neighboring PUs.

33. The non-transitory computer-readable storage medium of claim 30, wherein the first group of syntax elements includes four flags, and wherein each of the four flags is associated with a respective PU of an INTRA_N×N PU structure of the CU.

34. The non-transitory computer-readable storage medium of claim 30, further comprising instructions that cause the one or more processors to:
   intra-prediction encode the PUs of the CU based on the first group of syntax elements and the second group of syntax elements.

35. An apparatus for encoding video data, the apparatus comprising:
   means for generating a first group of syntax elements comprising a plurality of flags, wherein a flag of the plurality of flags of the first group of syntax elements indicates whether an intra-prediction mode of luma samples a respective prediction unit (PU) in a coding unit (CU) is based on an index into a list of most probable modes;
   means for generating a second group of syntax elements, wherein syntax elements of the second group of syntax elements correspond to respective syntax elements of the first group of syntax elements, wherein the flag of the plurality of flags of the first group of syntax elements indicates which syntax element is to be outputted in the second group of syntax elements for the respective PU in the CU, wherein the second group of syntax elements comprises one of:
      a first syntax element that indicates the index into the list of most probable modes if the flag in the first group of syntax elements indicates that the intra-prediction mode of the luma samples of the respective PU is based on the index into the list of most probable modes; or
      a second syntax element that indicates the intra-prediction mode of the luma samples of the respective PU if the flag in the first group of syntax elements indicates that the intra-prediction mode of the luma samples of the respective PU is not based on the index into the list of most probable modes;
   means for context adaptive binary arithmetic coding (CABAC) encoding all syntax elements of the first group of syntax elements prior to bypass encoding any syntax elements of the second group of syntax elements;

means for bypass encoding the second group of syntax elements, subsequent to CABAC encoding all syntax elements of the second group of syntax elements the first group of syntax elements; and means for outputting the video data that includes the encoded first group of syntax elements and the encoded second group of syntax elements, wherein the means for outputting comprises means for outputting all syntax elements of the first group of syntax elements for the PUs of the CU before outputting any syntax elements of the second group of syntax elements for the PUs of the CU.

36. The apparatus of claim 35, further comprising:

means for CABAC encoding a first set of bins used to indicate a chroma intra prediction mode separately from the CABAC encoding of the first group of syntax elements; and means for bypass encoding a second set of bins used to indicate the chroma intra prediction mode separately from the bypass encoding of the second group of syntax elements.

* * * * *